(12) United States Patent
Tanumihardja et al.

(10) Patent No.: US 8,065,371 B1
(45) Date of Patent: Nov. 22, 2011

(54) CROSS-PLATFORM MANAGED MESSAGE EXCHANGE

(75) Inventors: Marcellino Tanumihardja, Lynnwood, WA (US); Gregory A. Brown, Mercer Island, WA (US)

(73) Assignee: Remote Sales, LLC, Las Vegas, NV (US)

( * ) Notice: Subject to any disclaimer, the term of this patent is extended or adjusted under 35 U.S.C. 154(b) by 151 days.

(21) Appl. No.: 12/045,176

(22) Filed: Mar. 10, 2008

Related U.S. Application Data

(62) Division of application No. 09/894,278, filed on Jun. 27, 2001, now Pat. No. 7,386,589.

(60) Provisional application No. 60/282,381, filed on Apr. 5, 2001.

(51) Int. Cl.
*G06F 15/16* (2006.01)

(52) U.S. Cl. ........ 709/206; 709/204; 709/205; 709/245; 715/752

(58) Field of Classification Search .................. 709/204, 709/205, 206, 245; 715/752
See application file for complete search history.

(56) References Cited

U.S. PATENT DOCUMENTS

| | | | |
|---|---|---|---|
| 5,396,537 A * | 3/1995 | Schwendeman | 340/7.23 |
| 5,675,733 A * | 10/1997 | Williams | 709/206 |
| 5,878,230 A * | 3/1999 | Weber et al. | 709/238 |
| 5,930,471 A * | 7/1999 | Milewski et al. | 709/204 |
| 6,147,977 A | 11/2000 | Thro | |
| 6,260,024 B1 | 7/2001 | Shkedy | |
| 6,370,566 B2 | 4/2002 | Discolo | |
| 6,430,624 B1 | 8/2002 | Jamtgaard | |
| 6,463,462 B1 * | 10/2002 | Smith et al. | 709/206 |
| 6,499,018 B1 | 12/2002 | Alaia | |
| 6,529,725 B1 | 3/2003 | Joao | |
| 6,609,156 B1 * | 8/2003 | Magolan et al. | 709/232 |
| 6,636,888 B1 * | 10/2003 | Bookspan et al. | 709/203 |
| 6,715,129 B1 | 3/2004 | Hind | |
| 6,741,853 B1 | 5/2004 | Jiang | |
| 6,741,855 B1 | 5/2004 | Martin | |
| 6,785,730 B1 | 8/2004 | Taylor | |
| 7,089,208 B1 | 8/2006 | Levchin | |
| 2008/0319859 A1 | 12/2008 | Rhoads | |

OTHER PUBLICATIONS

"It's a Party—Who's Got the Chips?" Inside the Internet 7(12):1-6, Dec. 2000.
Zaplet Appmail, © 1999-2001 Zaplet, Inc., <http://www.zaplet.com/> [retrieved Sep. 17, 2001], 26 pages.
Evite.com, © 2001 Ticketmaster, <http://evite.citysearch.com> [retrieved Sep. 17, 2001], 35 pages.
EnvoyWorldWide, ©1999-2001 EnvoyWorldWide, Inc., <http://www.envoyww.com/services/> [retrieved Sep. 18, 2001], 5 pages.
"2Notify Enterprise Alerting: Alerts on Every Enterprise Messaging Channel," © 2005 Air2Web, Inc, <http://www.air2web.com/2notify_eaf.php> [retrieved Oct. 7, 2005], 2 pages.
"American Idol Teams With Mobliss to Help Fans Choose America's Next Idol," Business Wire, Jan. 17, 2008, <http://www.businesswire.com/cgi-bin/f_headline.cgi?bw.011703/230172086> [retrieved Oct. 7, 2005], 2 pages.

(Continued)

*Primary Examiner* — Liangche A Wang

(57) ABSTRACT

Software is executed on a wireless device for presenting a response aggregation drawn upon a message having at least two desired recipients. The software of presenting at least two message-structure item questions via the wireless device and receives input requesting response aggregation drawn upon the message having at least two desired recipients and transmits the message to at least one of the at least two desired recipients using the wireless device.

10 Claims, 42 Drawing Sheets

OTHER PUBLICATIONS

"Cingular Wireless Licenses Air2Web's Notify Platform to Manage Text Messaging Services," Air2Web Press Release, Atlanta, Apr. 21, 2003, <http://www.air2web.com/pr_display.php?id=107> [retrieved Oct. 7, 2005], 2 pages.

"Inaugural College Music Awards™ Garner Top Partners Rolling Stone®, Westwood One and Mobliss®," Zilo Networks, Inc., Press Release, New York, Nov. 29, 2004, <http://www.zilo.com/docs/index.cfm?disp=press112904> [retrieved Oct. 7, 2005], 2 pages.

"Mobile Messaging: Wireless," © 2005 GoldPocket Interactive, <http://www.goldpocket.com/Corp/Main.aspz?11=1&sp=1_3_1t=Main> [retrieved Oct. 7, 2005], 1 page.

"Mobliss Selected to Deliver Interactive Wireless Polling for New Fox Series—The Jury," Mobliss Corporation Press Release, Seattle, Jun. 7, 2004, <http://www.mobliss.com/about/newsroom/2004.06.07.jsp> [retrieved Oct. 7, 2005], 1 page.

"Nextel Calls on Fans to Pick All-Star Competitor; For the First Time, Fans Will Vote-In a Driver for Nascar Nextel All-Star Challenge," Nextel Communications, Inc., Press Release, Reston, Virginia, May 13, 2004, <http://phx.corporate-ir.net/phoenix.zhtml?c=63347&p=irol-newsArticle_print&ID=526687&highlight> [retrieved Oct. 7, 2005], 2 pages.

"Text Messaging: Words Have Power," © 2004 Mobliss Corporation, <http://mobliss.com/products/messaging/> [retrieved Oct. 7, 2005], 1 page.

"Zee TV Viewers, in the UK, Go Wireless Using Air2Web: Zee Fans Vote for Zee Cine Awards Using Their Cell Phones," Air2Web Press Release, Atlanta, Mar. 28, 2005, <http://www.air2web.com/pr_display.php?id=130> [retrieved Oct. 7, 2005], 1 page.

"GVC Licenses Phone.com UP.Browser for Mobile Phones in Asia and Europe," Phone.com Press Release, Redwood City, California, Feb. 23, 2000, 3 pages.

Martin, D., "Adapting Content for VoiceXML," XML.com, Aug. 23, 2000, <http://www.xml.com/pub/a/2000/08/23/didier/index.htm>, 5 pages.

Fielding, R., et al., RFC-2616: Hypertext Transfer Protocol—HTTP/1.1, Jun. 1999 [retrieved Dec. 29, 2009], 7 pages.

* cited by examiner

*Fig.11B-1.*

```
New Memo

Subject :
Quarterly Report 1

OK                    alpha
```

*Fig.11B-2.*

```
Memo Options

Recipients to
comment ?

1 ▶Yes
2  No

```
Show recipients
list ? :

1 ▶Yes
2  No

```
Message Body :

Please send me your
Quarterly report . 1

OK                    alpha
```

*Fig.11C-1.*

```
Add a Question ? :

1 ▶Yes
2  No

```
Question Type :

1  Yes/No
2  Number
3  Text
4 ▶Multi-choice

OK              Cancel
```

*Fig.11C-3.*

```
Enter Question:

What was your quarterly
sales figure ? 1

OK                 alpha
```

*Fig.11C-4.*

```
Enter answers
separated by ",":
Less than 2K, Between
2K – 5K, More than 5K 1

OK                 alpha
```

*Fig.11C-5.*

```
Add Another
Question ? :

1  Yes
2 ▶No

```
What semester will
you graduate ?

1  Winter 2001
2  Fall 2001
3  Spring 2002
─────────────────
Next
```

*Fig.18C-2.*

```
Thank you for your
Response.

1▶Return to Message
2  List Messages

─────────────────
OK
```

CROSS-PLATFORM MANAGED MESSAGE EXCHANGE

CROSS-REFERENCES TO RELATED APPLICATIONS

This patent application is a division of patent application Ser. No. 09/894,278, filed Jun. 27, 2001, which claims the benefit under 35 U.S.C. 119(e) of Provisional Patent Application No. 60/282,381, filed Apr. 5, 2001, both of which are incorporated herein by reference in their entirety.

FIELD OF THE INVENTION

The present application relates, in general, to wireless communication.

BACKGROUND

Wireless communication refers to communication between sending and receiving stations via electromagnetic radiation not guided by any hard physical path (e.g., by microwave link). Examples of wireless communication are communication via cellular telephony systems, Personal Communication Systems, or Global System for Mobile Communication systems.

Wireless communication is typically accomplished via users exchanging voice and/or alphanumeric data via use of at least one wireless device. One example of wireless communication is that of a first wireless-device user exchanging voice and/or alphanumeric data with a group of two or more other wireless-device users.

It has been noted by the inventors named herein (the inventors) that when a first wireless-device user finds it advantageous to exchange voice and/or alphanumeric data with a group of wireless-device users, the first wireless-device user either may want to disseminate information to the group, or may instead want to both disseminate information to the group and receive feedback from the group members in response to the disseminated information. It has been further noted by the inventors that when such group communication is performed in the related art, it is generally done manually, in that the first wireless-device user must generally contact each of the group members and disseminate the voice and/or alphanumeric data on an individual basis. Thereafter, typically the first wireless-device user manually aggregates and transforms the responses from the users in the group if such aggregation or transformation is desired.

The inventors have noted that there are several disadvantages to the manual method of the related art. First, the inventors have noted that it is very tedious and time intensive to contact and disseminate information to the group, particularly if data transmission is involved. Second, the inventors have noted that insofar as group members may be temporarily unavailable, the first wireless-device user must seek to repetitively call the unavailable group members. Third, the inventors have noted that it is very tedious and time intensive to manually aggregate and transform responses from the group members. Fourth, the inventors have noted that if a group member is not interested in either receiving or responding to the disseminated information, the first wireless-device user essentially wastes his time by contacting the disinterested user. Fifth, the inventors have noted that if a group member is undecided in his response to the disseminated information, the first wireless-device user must repetitively contact such undecided group member to see if the undecided group member has yet arrived at a decision. In addition to the foregoing, other disadvantages exist which will be appreciated by those having ordinary skill in the art.

In light of the foregoing, the inventors have noted that a need exists in the art for a method and system that will allow a wireless device user to easily disseminate information to and collect information from a group of wireless-device users.

SUMMARY OF THE INVENTION

The inventors have devised a method and system that will allow a wireless device user to easily disseminate information to and collect information from a group of wireless-device users.

In one embodiment, a method includes but is not limited to presenting, via a wireless device, a response aggregation drawn upon a message having at least two desired recipients.

In another embodiment, a method includes but is not limited to accepting, via a wireless device, user input requesting response aggregation drawn upon a message having at least two desired recipients.

In another embodiment, a method includes but is not limited to presenting at least two message-structure item questions via a wireless device.

In another embodiment, a method includes but is not limited to receiving input requesting response aggregation drawn upon a message having at least two desired recipients; and transmitting the message to at least one of the at least two desired recipients, wherein said transmitting is via at least one wireless device.

In another embodiment, a method includes but is not limited to transmitting, via a wireless device, a message having at least two desired recipients.

In addition to the foregoing, other method embodiments are described in the claims, drawing, and text forming a part of the present application.

In one or more various embodiments, related systems include but are not limited to circuitry for effecting the foregoing-described method embodiments; the circuitry can be virtually any combination of hardware, software, and/or firmware configured to effect the foregoing-described method embodiments depending upon the design choices of the system designer.

The foregoing is a summary and thus contains, by necessity; simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the non-limiting detailed description set forth herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11B-E depicts an example of a scheme used by many implementations herein when accepting user input defining the at least two desired recipients via entry of at least one desired-recipient item as described in method step 1100.

FIGS. 18B-C depicts an example of a scheme used in one implementation of displaying a message having at least one message-structure item.

The use of the same reference symbols in different drawings indicates similar or identical items.

DETAILED DESCRIPTION OF THE PREFERRED EMBODIMENT

Figure 1:
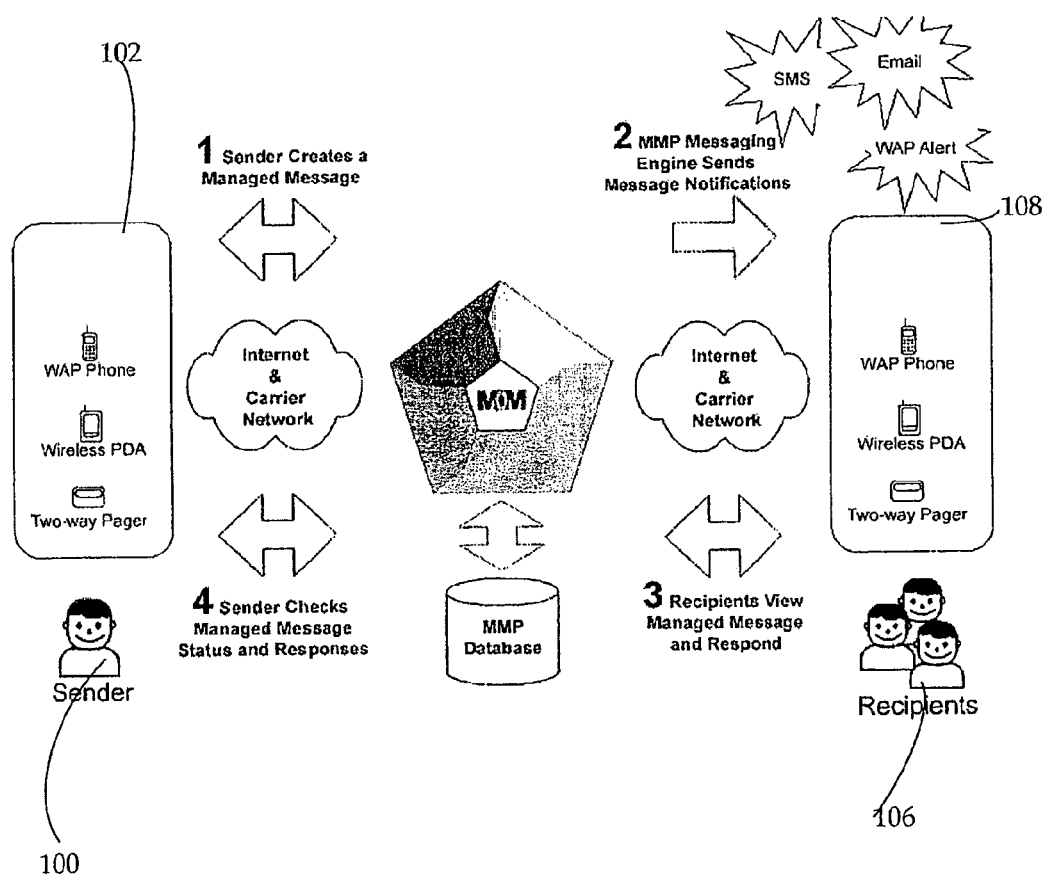
FIG. 1 shows a pictographic representation of an environment wherein methods and systems described herein may be utilized.

With reference now to FIG. 1, shown is a pictographic representation of an environment wherein methods and systems described herein may be utilized. First, depicted in FIG. 1 is that sender 100, by use of wireless device 102 creates a message via communication with Managed Messaging Platform (MMP) engine 104 (as shown, wireless device 102 may be any type of wireless device such as a Wireless Application Protocol (WAP) phone, a wireless Personal Digital Assistant (PDA), or a two-way pager). Second, illustrated is that MMP engine 104 sends message notifications to each wireless device 108 associated with each desired recipient forming group of desired recipients 106 (as shown, each wireless device 108 may be any type of wireless device such as a Wireless Application Protocol (WAP) phone, a wireless Personal Digital Assistant (PDA), or a two-way pager). Third, shown is that one or more desired recipients in group of desired recipients 106 view and/or respond to the message via communication with MMP engine 104, where such viewing and/or responding is achieved via each desired recipient's use of his or her respective wireless device 108. Fourth, depicted is that sender 100, via communication with MMP engine 104, uses his wireless device 102 to check the message status and responses, where the statuses and responses may have been aggregated by MMP engine 104. For more details related to the foregoing scheme, please see herein incorporated by reference Provisional Patent Application 60/282,381.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either substeps or additional steps building on one or more earlier-presented flowcharts. Those having ordinary skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

I. Managed Messaging as Observed from a Sender's Wireless Device

A. Displaying Response Aggregation Via a Sender's Wireless Device

Figure 2:
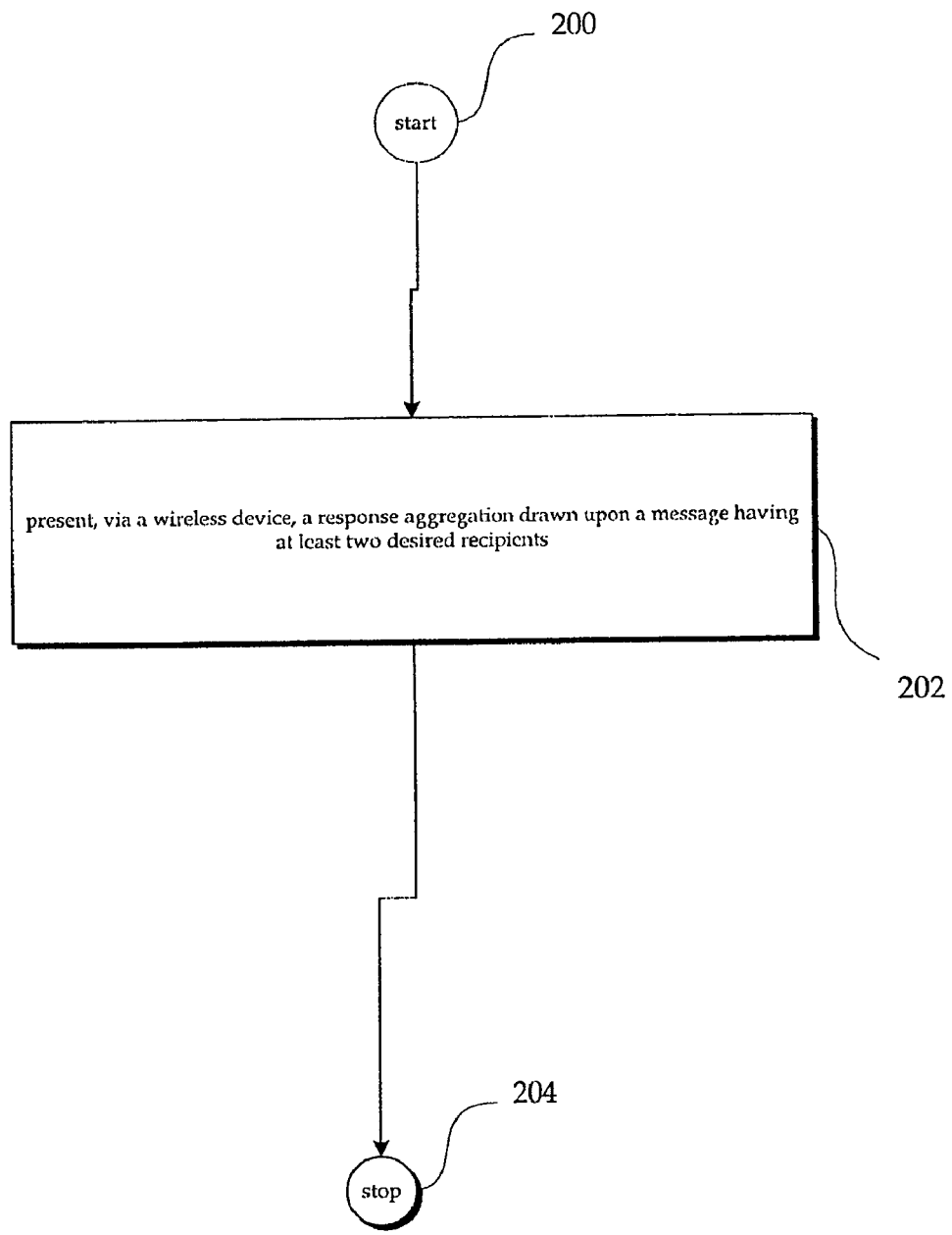
FIG. 2 depicts a process via a wireless device, a response to aggregation drawn upon a message having at least two desired recipients.

Referring now to FIG. 2, shown is a high-level logic flowchart depicting a process. Method step 200 depicts the start of process. Method step 202 illustrates presenting, via a wireless device (e.g., wireless device 102), a response aggregation drawn upon a message having at least two desired recipients (e.g., group of desired recipients 106). Method step 204 shows the end of the process.

Figure 3:
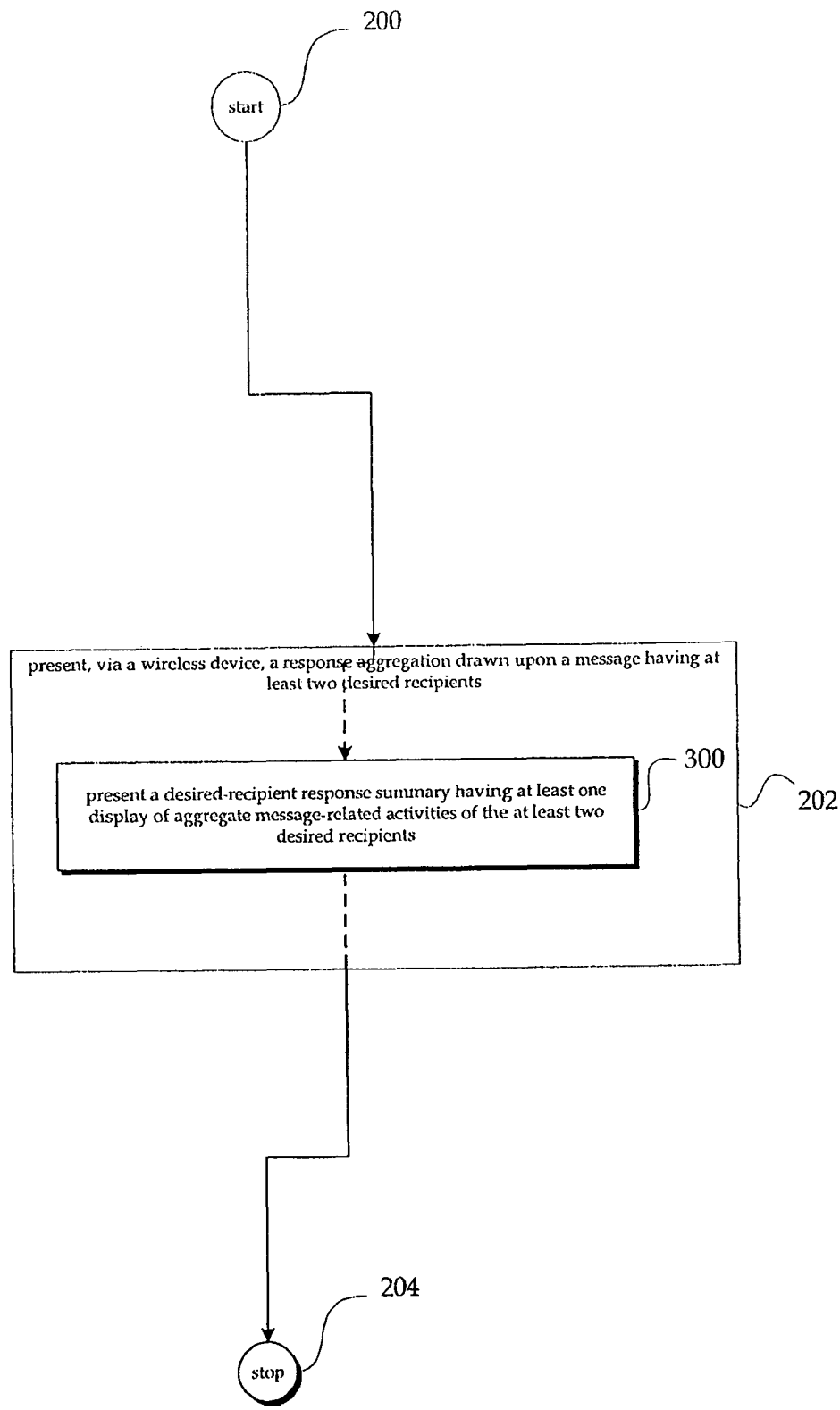
FIG. 3 depicts that, in one implementation, method step 202 includes method step 300.

With reference now to FIG. 3, shown is an implementation of the high-level logic flowchart shown in FIG. 2. Depicted in FIG. 3 is that, in one implementation, method step 202 includes method step 300. Method step 300 shows that, in one implementation, presenting, via a wireless device, a response aggregation drawn upon a message having at least two desired recipients can include, but is not limited to, presenting a desired-recipient response summary having at least one display of aggregate message-related activities of the at least two desired recipients. (For example, such as was at least partially described in the herein incorporated by reference Provisional Patent Application No. 60/282,381.) The remaining method steps of FIG. 3 function substantially as described elsewhere herein.

Figure 8A:
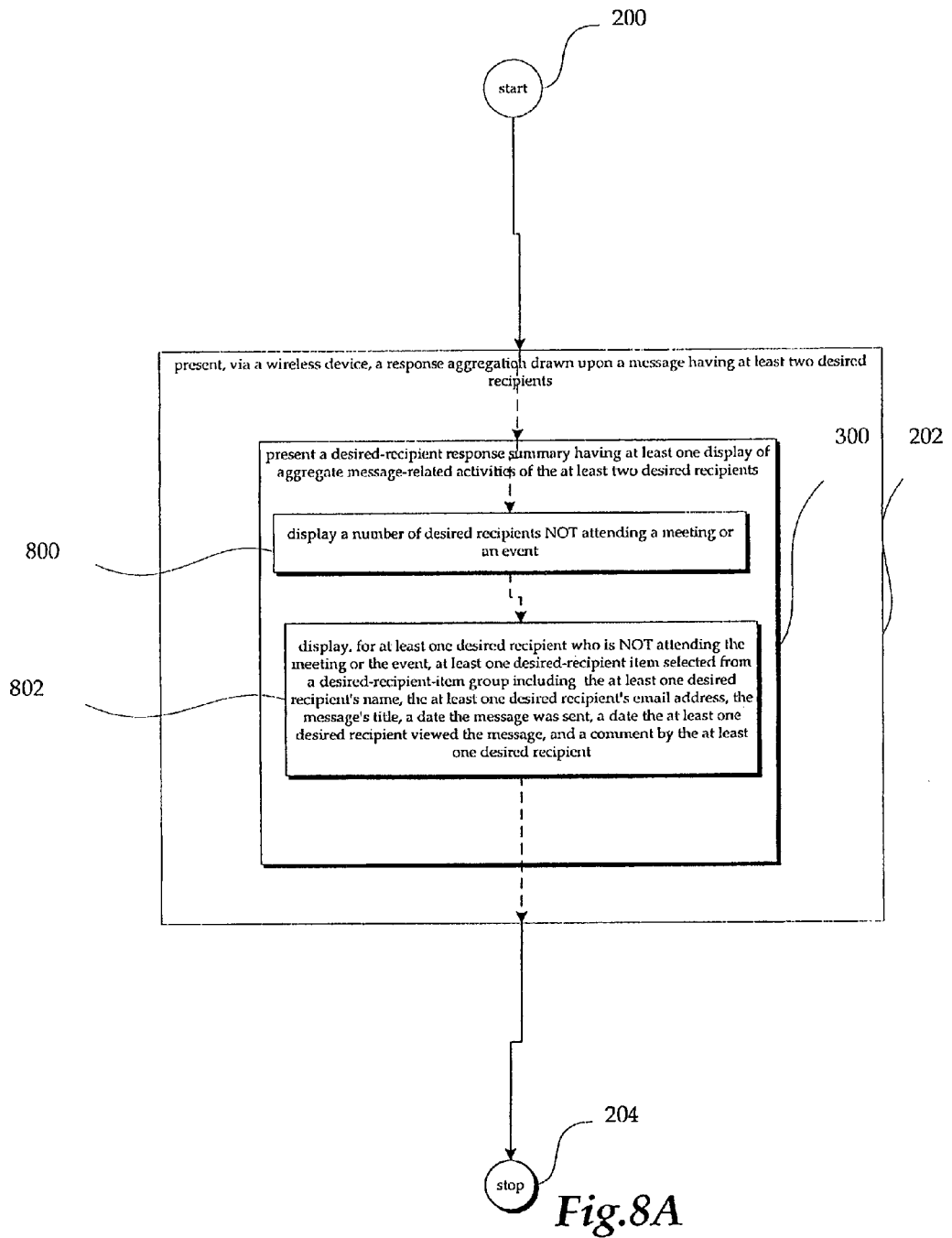
FIG. 8A depicts that, in one implementation, of method step 300, presenting a desired-recipient response summary having at least one display of aggregate message-related activities of the at least two desired recipients can include, but is not limited to, method steps 800 and 802
Figures 1, 8B:
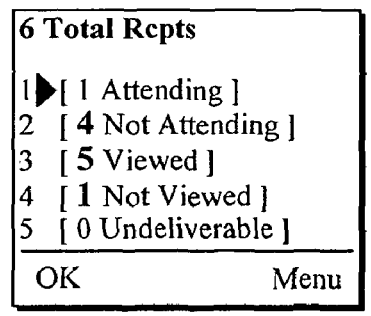
FIG. 8B depicts an example of a scheme used by many implementations herein when presenting a desired-recipient response summary having at least one display of aggregate message-related activities of the at least two desired recipients as described in method step 300.
Figures 2, 8B:
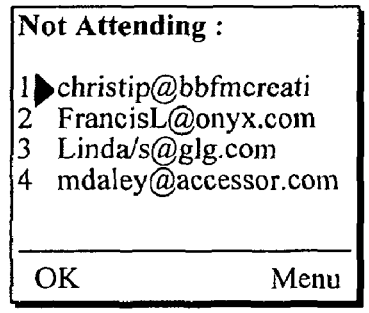
Figures 3, 8B:
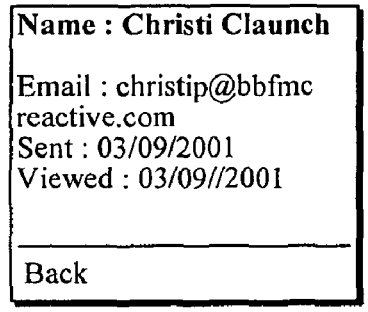
Figures 4, 8B:
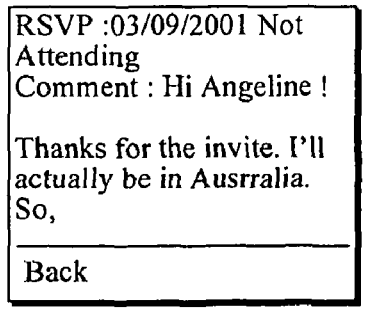

Referring now to FIG. 8B, depicted is an example of a scheme used by many implementations herein when presenting a desired-recipient response summary having at least one display of aggregate message-related activities of the at least two desired recipients as described in method step 300. Specifically, shown is a pictographic representation of a wireless device screen having an implementation of desired-recipient response summary 850 which shows a total number of 6 desired recipients in a group of desired recipients to whom a message has been sent, and that of those 6 desired recipients, 5 have viewed the message (of which 4 have indicated that they will not be attending a meeting or event to which the message is related, while 1 has indicated he or she will be attending a meeting or event to which the message is related), 1 has not viewed the message, 0 of the desired recipients are unreachable (i.e., 0 messages were detected undeliverable).

Referring now again to FIG. 8B shown is that, in one implementation, it is possible to "drill down" into the "not attending" aspect of desired-recipient response summary 850, which results in the display of a list of addresses of those desired recipients who have responded to the message that they are NOT attending. In addition, further depicted is that it is possible to further "drill down" into individually listed desired recipients to gain more information related to such desired recipients (e.g., name, email address, time the message was sent to the desired recipient, the time the message was viewed by the desired recipient, an RSVP by the desired recipient, and a comment from the desired recipient).

Figure 4:
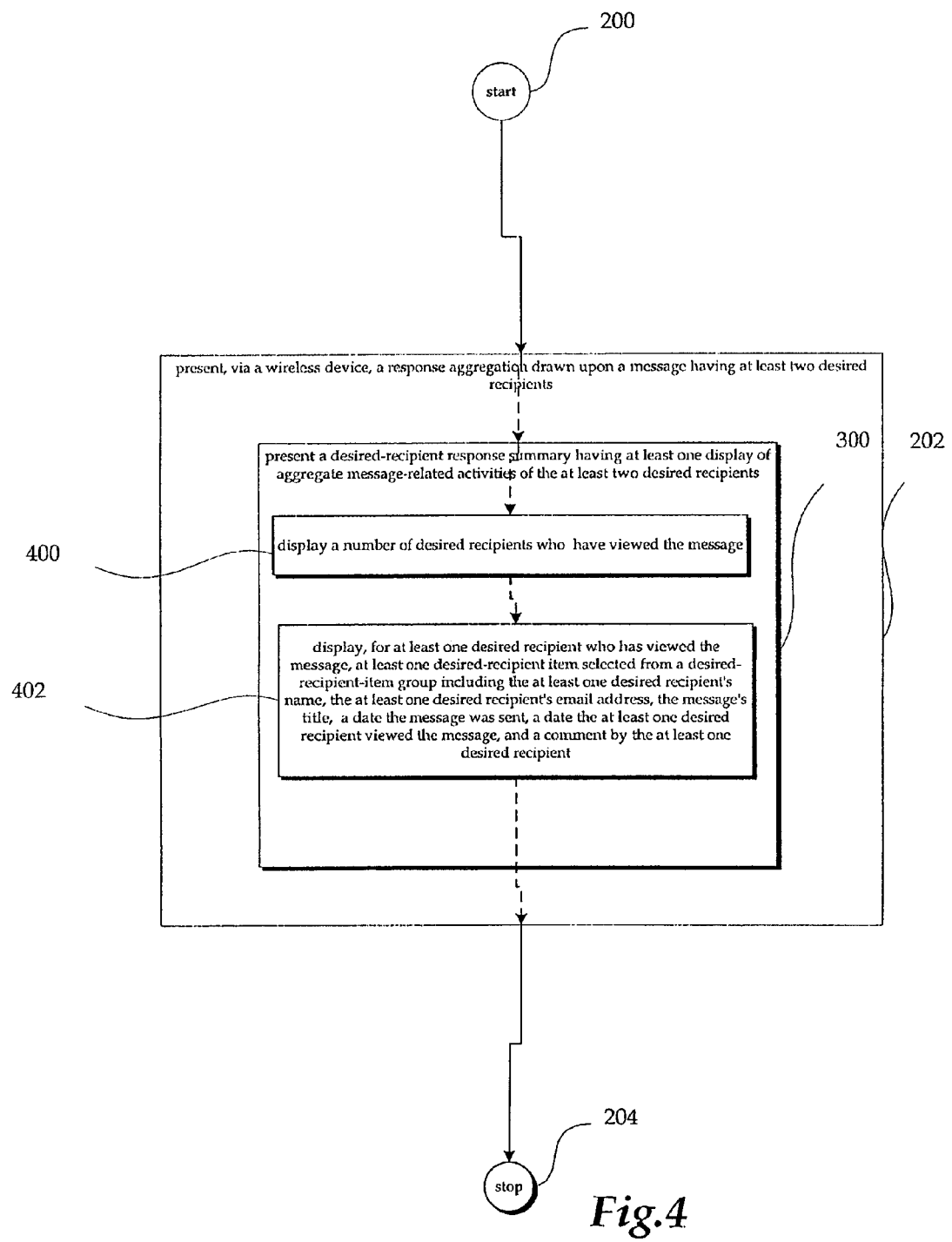
FIG. 4 depicts that, in one implementation, of method step 300, presenting a desired-recipient response summary having at least one display of aggregate message-related activities of the at least two desired recipients can include, but is not limited to, method steps 400 and 402.

With reference now to FIG. 4, shown is an implementation of the high-level logic flowchart shown in FIG. 3. Depicted in FIG. 4 is that, in one implementation, of method step 300, presenting a desired-recipient response summary having at least one display of aggregate message-related activities of the at least two desired recipients can include, but is not limited to, method steps 400 and 402. Method step 400 shows displaying a number of desired recipients who have viewed the message. Method step 402 depicts displaying, for at least one desired recipient who has viewed the message, at least one desired-recipient item selected from a desired-recipient-item group including the at least one desired recipient's name, the at least one desired recipient's email address, the message's title, a date the message was sent, a date the at least one desired recipient viewed the message, and a comment by the at least one desired recipient; typically (but not always) method step 402 occurs in response to user input. (For example, such as was at least partially described in the herein incorporated by reference Provisional Patent Application No. 60/282,381.) The remaining method steps of FIG. 4 function substantially as described elsewhere herein.

In one implementation, method steps 400 and 402 are effected via a drill-down scheme analogous to that depicted and described in relation to FIG. 8B.

Figure 5:
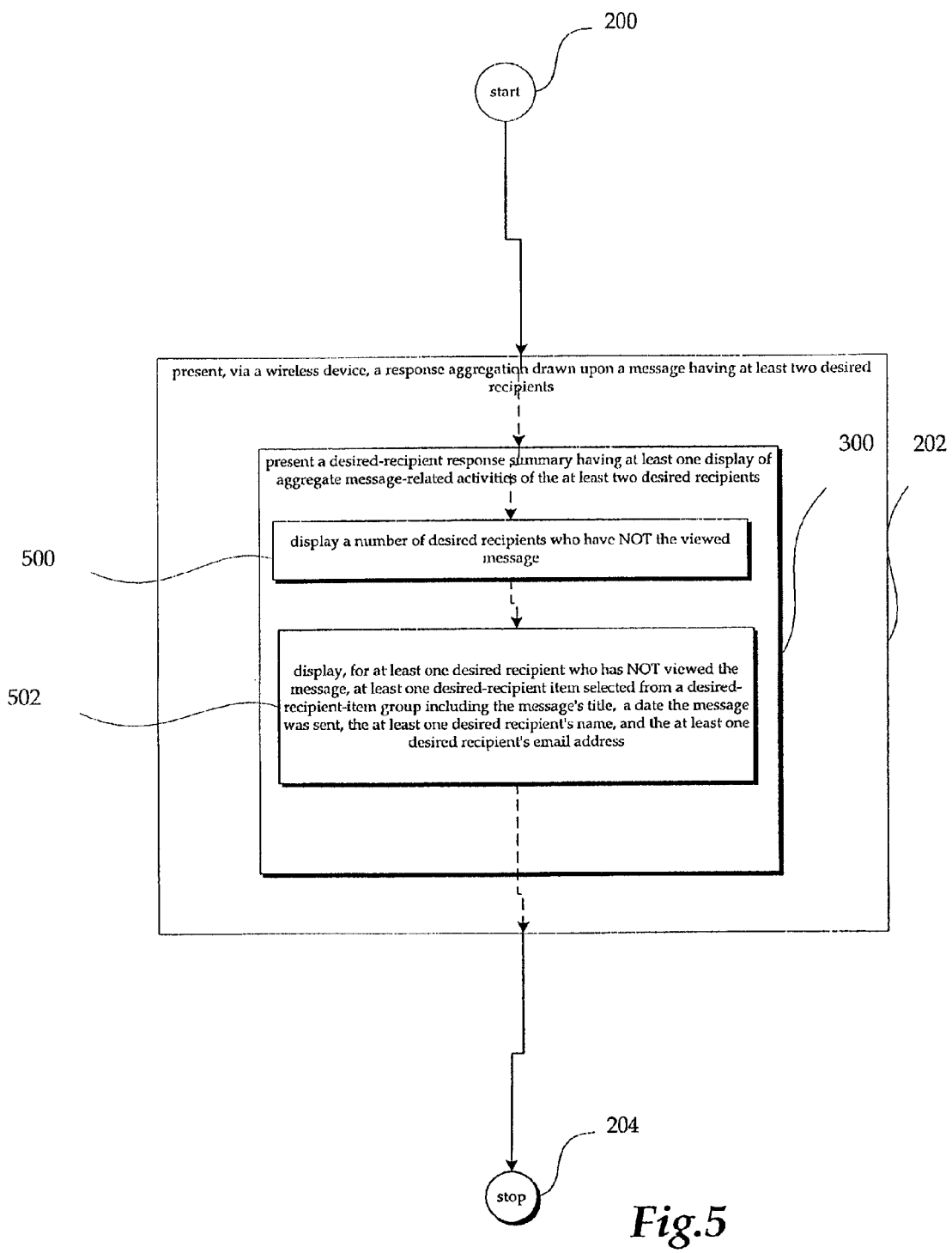
FIG. 5 depicts that, in one implementation, of method step 300, presenting a desired-recipient response summary having at least one display of aggregate message-related activities of the at least two desired recipients can include, but is not limited to, method steps 500 and 502.

With reference now to FIG. 5, shown is an implementation of the high-level logic flowchart shown in FIG. 3. Depicted in FIG. 5 is that, in one implementation, of method step 300, presenting a desired-recipient response summary having at least one display of aggregate message-related activities of the at least two desired recipients can include, but is not limited to method steps 500 and 502. Method step 500 shows displaying a number of desired recipients who have NOT viewed the message. Method step 502 depicts displaying, for at least one desired recipient who has NOT viewed the message, at least one desired-recipient item selected from a desired-recipient-item group including the message's title, a date the message was sent, the at least one desired recipient's name, and the at least one desired recipient's email address; typically method step 502 occurs in response to user input. (For example, such as was at least partially described in the herein incorporated by reference Provisional Patent Application No. 60/282,381.) The remaining method steps of FIG. 5 function substantially as described elsewhere herein. In one implementation, method steps 500 and 502 are effected via a drill-down scheme analogous to that depicted and described in relation to FIG. 8B.

Figure 6:
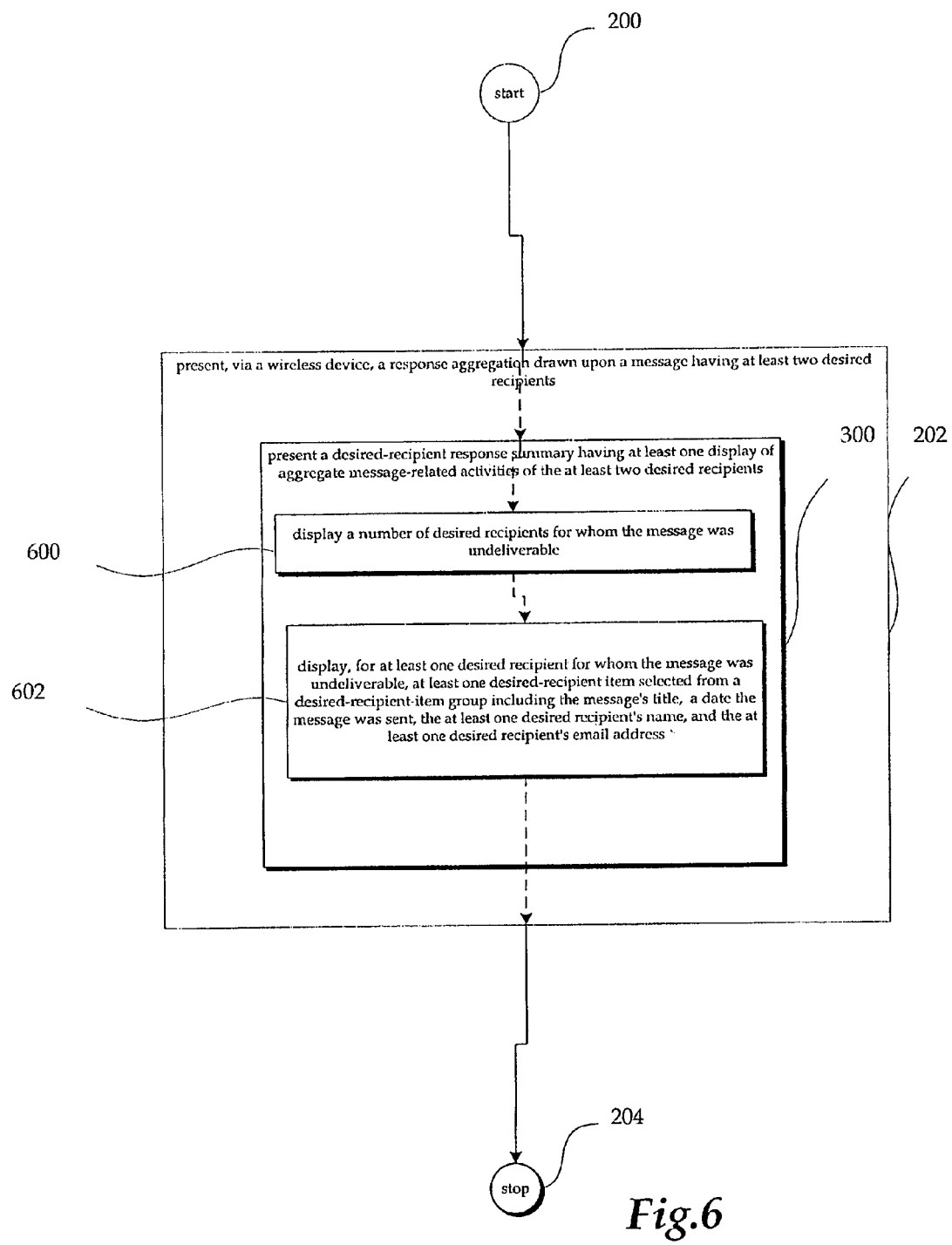
FIG. 6 shows in one implementation, of method step 300, presenting a desired-recipient response summary having at least one display of aggregate message-related activities of the at least two desired recipients can include, but in not limited to, method steps 600 and 602.

With reference now to FIG. 6, shown is an implementation of the high-level logic flowchart shown in FIG. 3. Depicted in FIG. 6 is that, in one implementation, of method step 300, presenting a desired-recipient response summary having at least one display of aggregate message-related activities of the at least two desired recipients can include, but is not limited to, method steps 600 and 602. Method step 600 shows displaying a number of desired recipients for whom the message was undeliverable. Method step 602 depicts displaying, for at least one desired recipient for whom the message was undeliverable, the message's title, a date the message was sent, at least one desired-recipient item selected from a desired-recipient-item group including the at least one desired recipient's name, and the at least one desired recipient's email address. (For example, such as was at least partially described in the herein incorporated by reference Provisional Patent Application No. 60/282,381.) The remaining method steps of FIG. 6 function substantially as described elsewhere herein. In one implementation, method steps 600 and 602 are effected via a drill-down scheme analogous to that depicted and described in relation to FIG. 8B.

Figure 7:
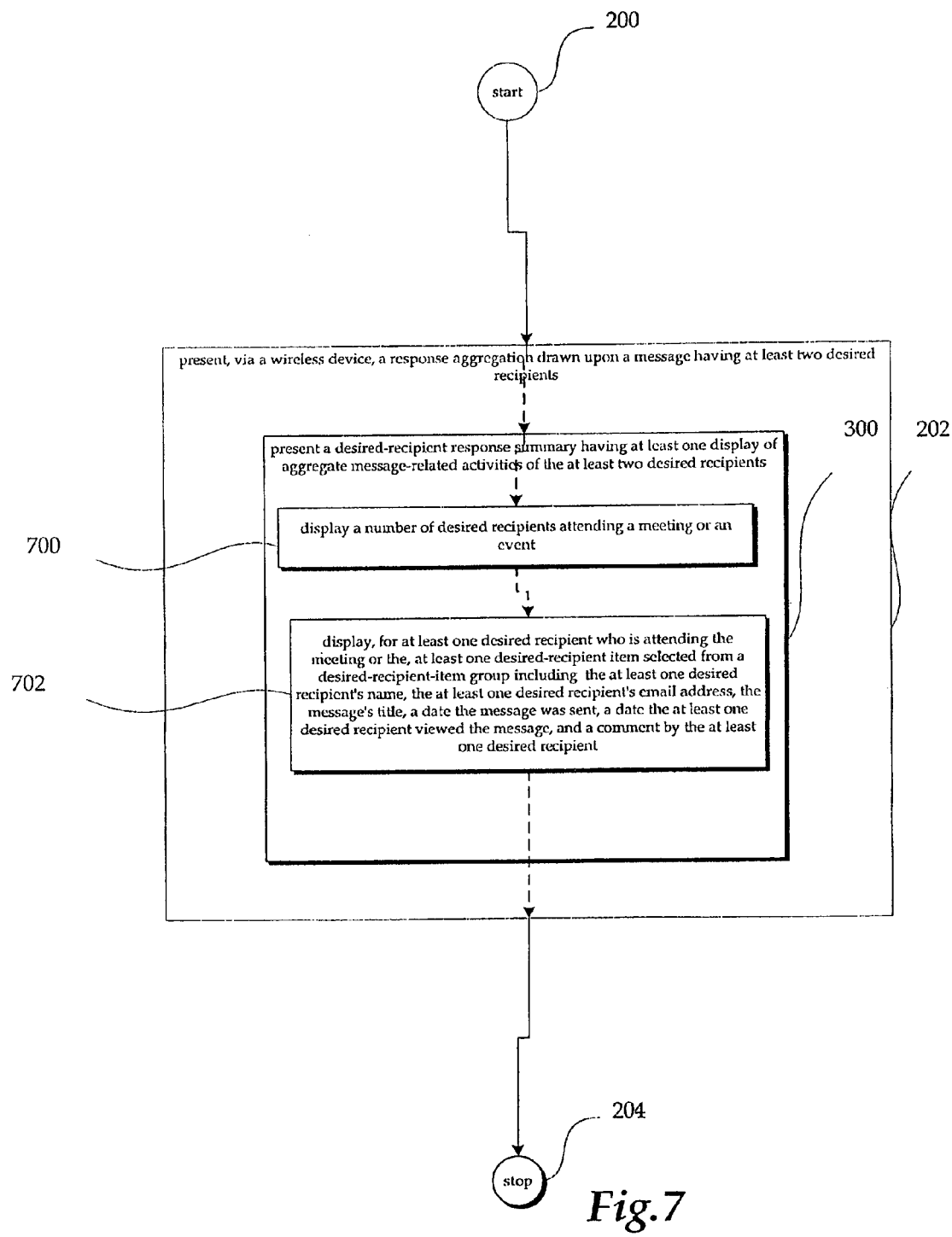
FIG. 7 depicts that, in one implementation, of method step 300, presenting a desired-recipient response summary having at least one display of aggregate message-related activities of the at least two desired recipients can include, but is not limited to, method steps 700 and 702.

With reference now to FIG. 7, shown is an implementation of the high-level logic flowchart shown in FIG. 3. Depicted in FIG. 7 is that, in one implementation, of method step 300, presenting a desired-recipient response summary having at least one display of aggregate message-related activities of the at least two desired recipients can include, but is not limited to, method steps 700 and 702. Method step 700 shows displaying a number of desired recipients attending a meeting or an event. Method step 702 depicts displaying, for at least one desired recipient who is attending the meeting or the event, at least one desired-recipient item selected from a desired-recipient-item group including the at least one desired recipient's name, the at least one desired recipient's email address, the message's title, a date the message was sent, a date the at least one desired recipient viewed the message, and a comment by the at least one desired recipient. (For example, such as was at least partially described in the herein incorporated by reference Provisional Patent Application No. 60/282,381.) The remaining method steps of FIG. 7 function substantially as described elsewhere herein. In one implementation, method steps 700 and 702 are effected via a drill-down scheme analogous to that depicted and described in relation to FIG. 8B.

With reference now to FIG. 8A, shown is an implementation of the high-level logic flowchart shown in FIG. 3. Depicted in FIG. 8A is that, in one implementation, of method step 300, presenting a desired-recipient response summary having at least one display of aggregate message-related activities of the at least two desired recipients can include, but is not limited to, method steps 800 and 802. Method step 800 shows displaying a number of desired recipients NOT attending a meeting or an event. Method step 802 depicts displaying, for at least one desired recipient who is NOT attending the meeting or the event, at least one desired-recipient item selected from a desired-recipient-item group including the at least one desired recipient's name, the at least one desired recipient's email address, the message's title, a date the message was sent, a date the at least one desired recipient viewed the message, and a comment by the at least one desired recipient. (For example, such as was at least partially described in the herein incorporated by reference Provisional Patent Application No. 60/282,381.) The remaining method steps of FIG. 8A function substantially as described elsewhere herein. In one implementation, method steps 800 and 802 are effected via a drill-down scheme analogous to that depicted and described in relation to FIG. 8B.

Referring now again to FIG. 8B shown is that, in one implementation, it is possible to "drill down" into the "not attending" aspect of desired-recipient response summary 850 which results in the display of a list of addresses of those desired recipients who have responded to the message that they are NOT attending. In addition, further depicted is that it is possible to further "drill down" into individually listed desired recipients to gain more information related to such desired recipients (e.g., name, email address, time the message was sent to the desired recipient, the time the message was viewed by the desired recipient, an RSVP by the desired recipient, and a comment from the desired recipient).

Figure 9:
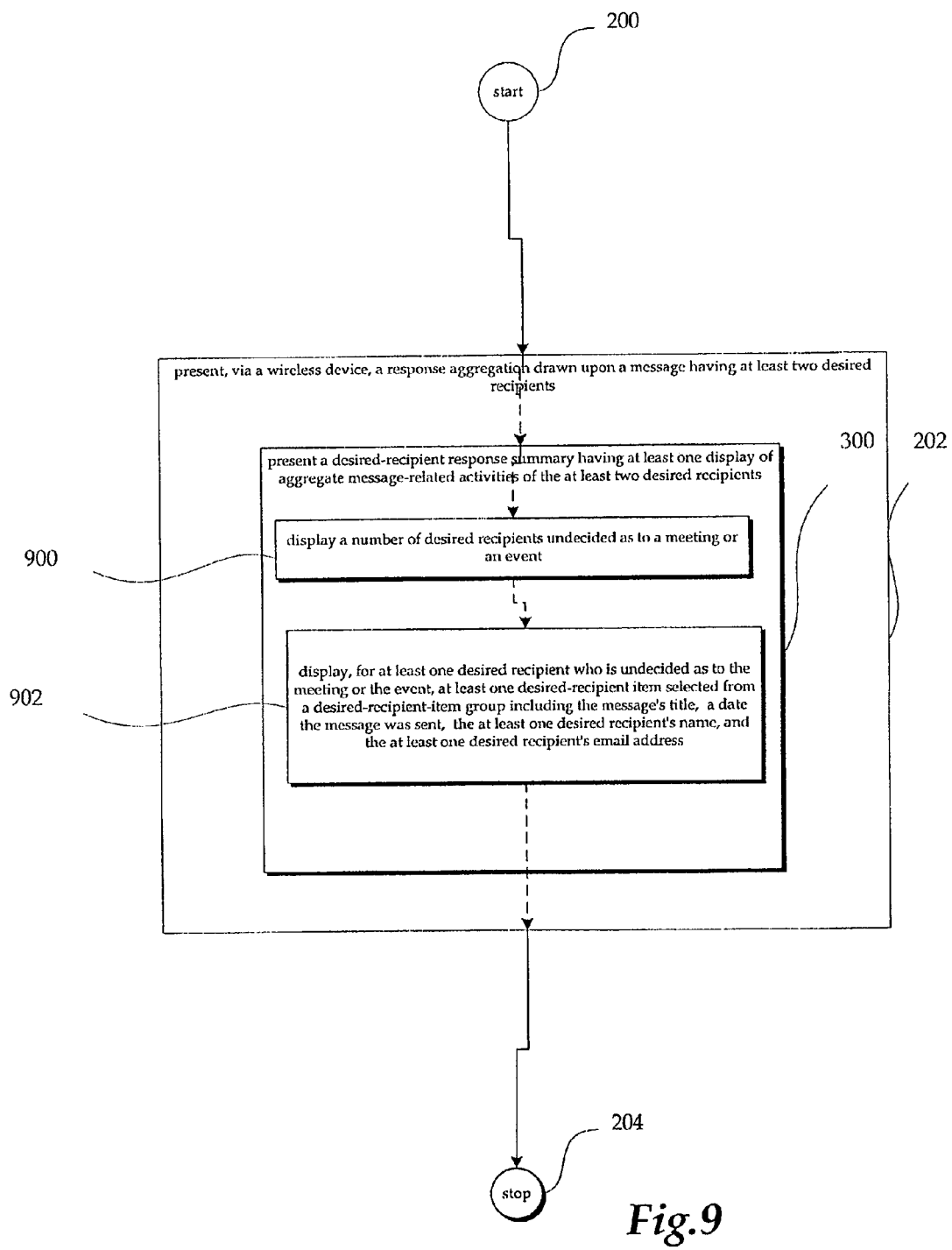
FIG. 9 depicts that, in one implementation, of method step 300, presenting a desired-recipient response summary having at least one display of aggregate message-related activities of the at least two desired recipients can include, but is not limited to, method steps 900 and 902.

With reference now to FIG. 9, shown is an implementation of the high-level logic flowchart shown in FIG. 3. Depicted in FIG. 9 is that, in one implementation, of method step 300, presenting a desired-recipient response summary having at least one display of aggregate message-related activities of the at least two desired recipients can include, but is not limited to, method steps 900 and 902. Method step 900 shows displaying a number of desired recipients undecided as to a meeting or an event. Method step 902 depicts displaying, for at least one desired recipient who is undecided as to the meeting or the event, at least one desired-recipient item selected from a desired-recipient-item group including the message title, a date the message was sent, the at least one desired recipient's name, and the at least one desired recipient's email address. (For example, such as was at least partially described in the herein incorporated by reference Provisional Patent Application No. 60/282,381.) The remaining method steps of FIG. 9 function substantially as described elsewhere herein. In one implementation, method steps 900 and 902 are effected via a drill-down scheme analogous to that depicted and described in relation to FIG. 8B.

B. Specifying Response Aggregation Via Sender's Wireless Device

Figure 10:
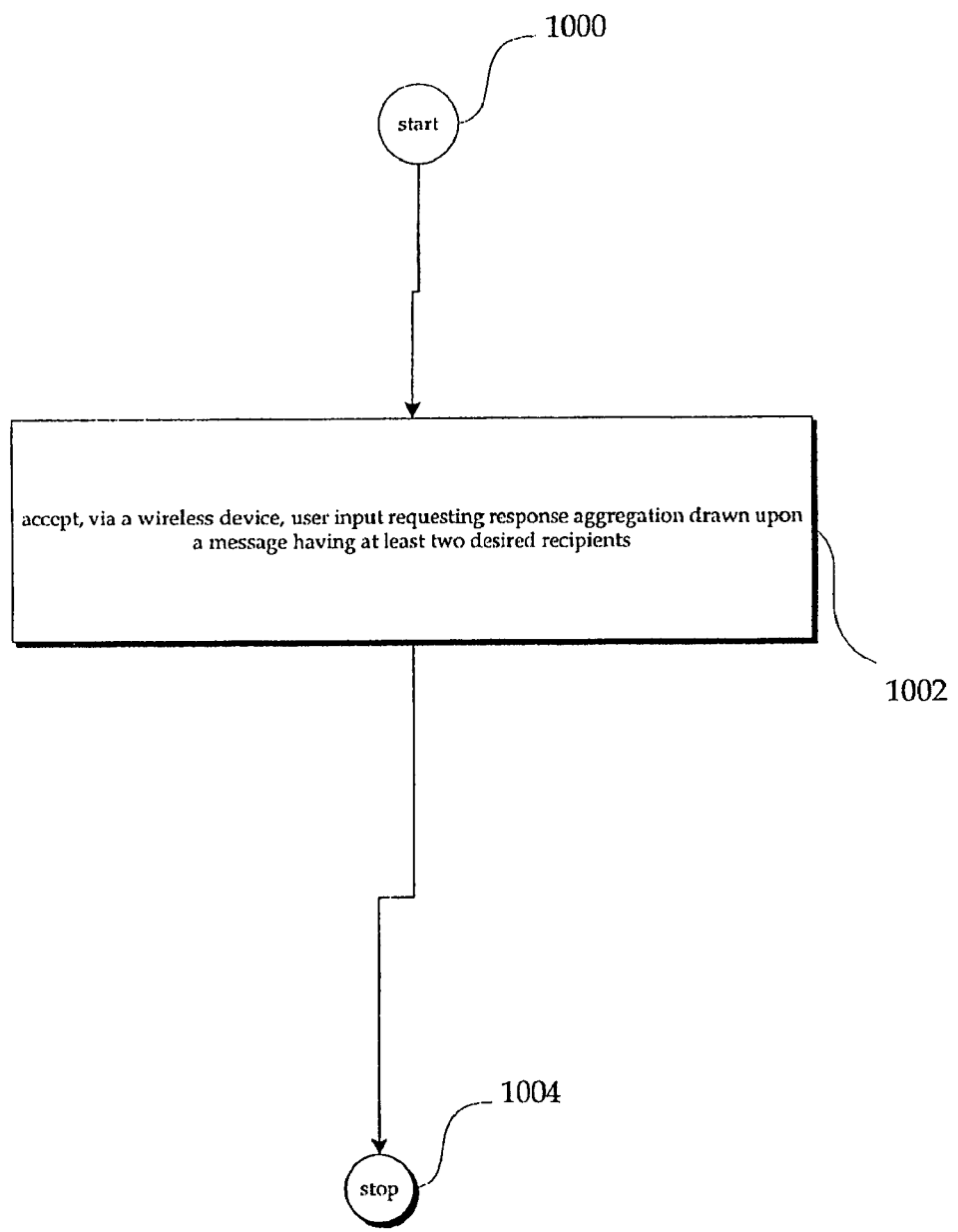
FIG. 10 shows a process via a wireless device, user input requesting response aggregation drawn upon a message having at least two desired recipients.

Referring now to FIG. 10, shown is a high-level logic flowchart depicting a process. Method step 1000 depicts the start of process. Method step 1002 illustrates accepting, via a wireless device, user input requesting response aggregation drawn upon a message having at least two desired recipients. Method step 1004 shows the end of the process.

Figure 11A:
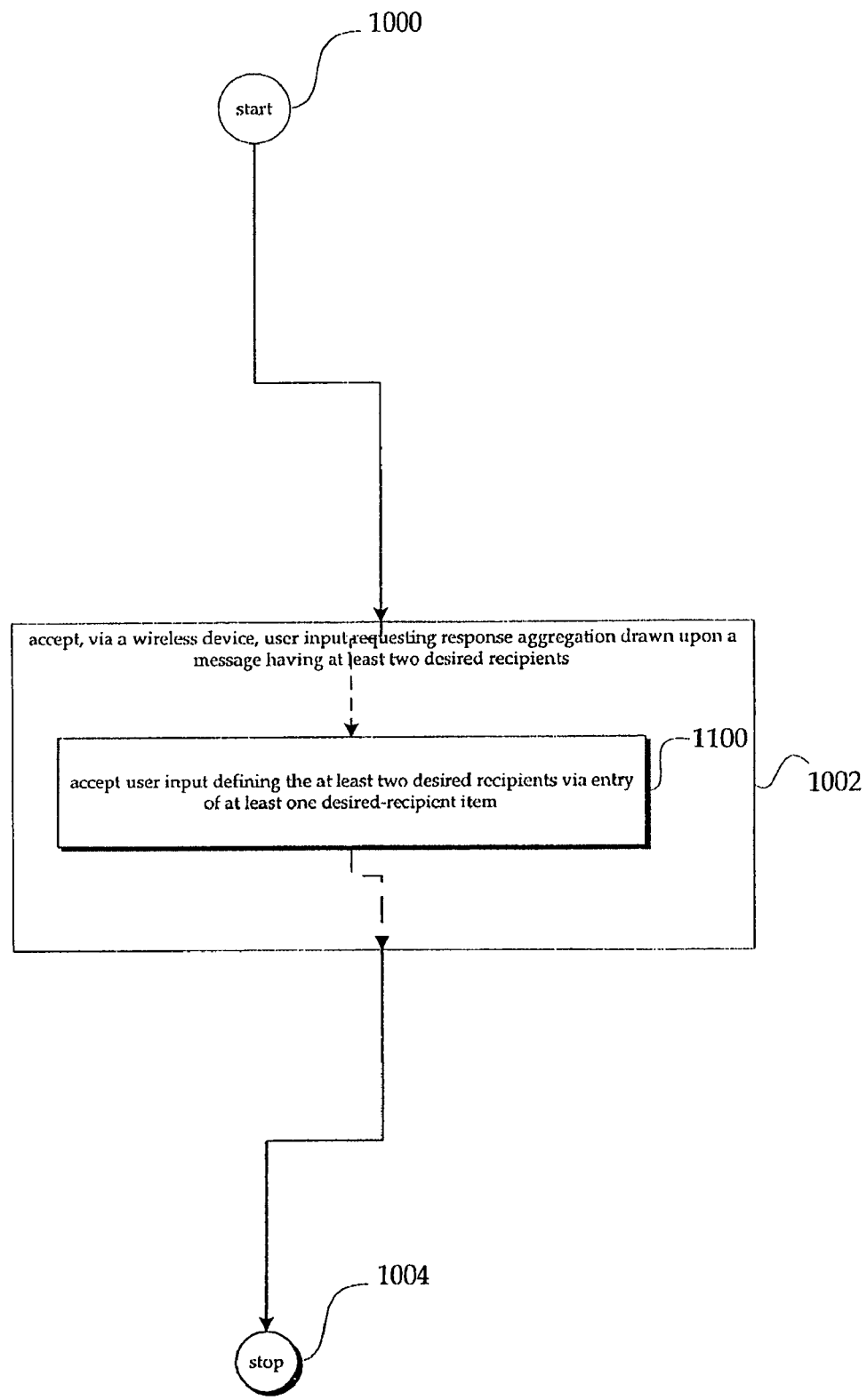
FIG. 11A shows that, in one implementation, method step 1002 includes method step 1100.
Figures 1, 11D:
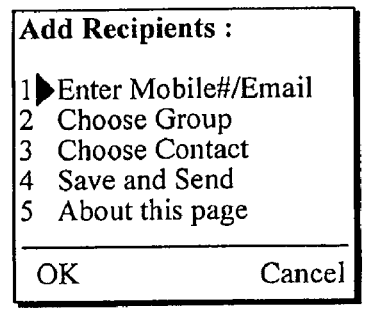
Figures 2, 11D:
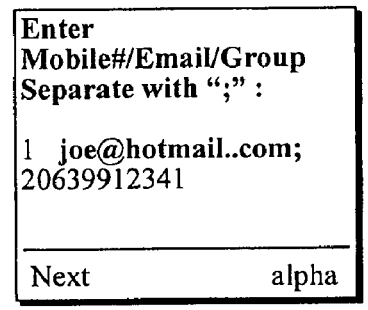
Figures 3, 11D:
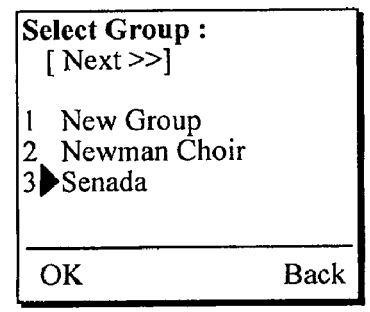
Figures 4, 11D:
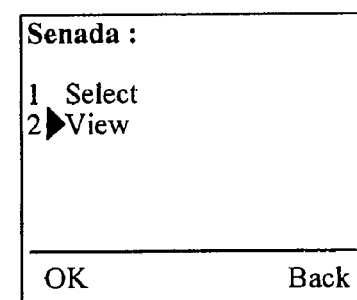
Figures 5, 11D:
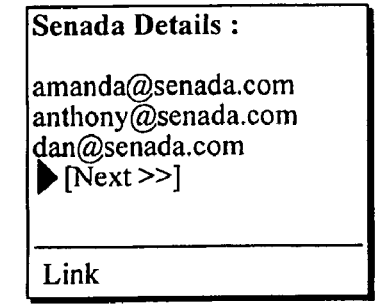
Figures 1, 11E:
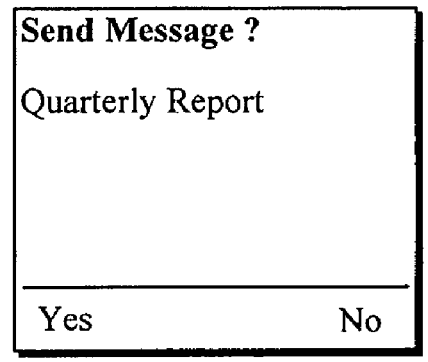
Figures 2, 11E:
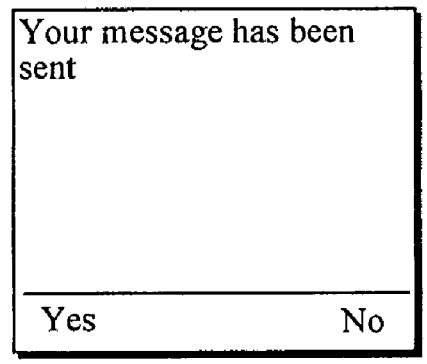
Figures 3, 11E:
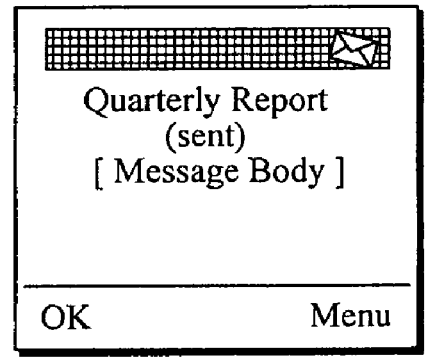

With reference now to FIG. 11A, shown is an implementation of the high-level logic flowchart shown in FIG. 10. Depicted in FIG. 11A is that, in one implementation, method step 1002 includes method step 1100. Method step 1100 shows that, in one implementation, accepting, via a wireless device, user input requesting response aggregation drawn upon a message having at least two desired recipients can include, but is not limited to, accepting user input defining the at least two desired recipients via entry of at least one desired-recipient item. (For example, such as was at least partially described in the herein incorporated by reference Provisional Patent Application No. 60/282,381.) The remaining method steps of FIG. 11A function substantially as described elsewhere herein.

Referring now to FIGS. 11B-E, depicted is an example of a scheme used by many implementations herein when accepting user input defining the at least two desired recipients via entry of at least one desired-recipient item as described in method step 1100. Illustrated in FIGS. 11B-E is a set of user interactions between a user and a wireless device whereby the user creates and sends a type of message known as a "memo."

Following are several flowchart-based descriptions of various implementations of systems and devices. In general, with respect to interactions via wireless devices, implementations of these flowchart-based descriptions follow the example scheme set forth in FIGS. 11B-E. That is, in general implementations follow the approach whereby a user can define a message via entry of data through a wireless device via a scheme analogous to that shown and described in relation to FIGS. 11B-E.

Reference to Provisional Patent Application No. 60/282, 381, entitled WIRELESS PAYMENT PROCESSING, which is hereby incorporated by reference in its entirety, will show that in Provisional Patent Application No. 60/282,381 a "structured message" is described as a "memo," and that extensions of the "memo" are therein described as a "meeting," and an "event." The description herein substantially follows the convention in the provisional by defining a set of attributes ("message-structure items") for messages and thereafter expanding those attributes to encompass meetings and/or events, where appropriate.

Figure 12:
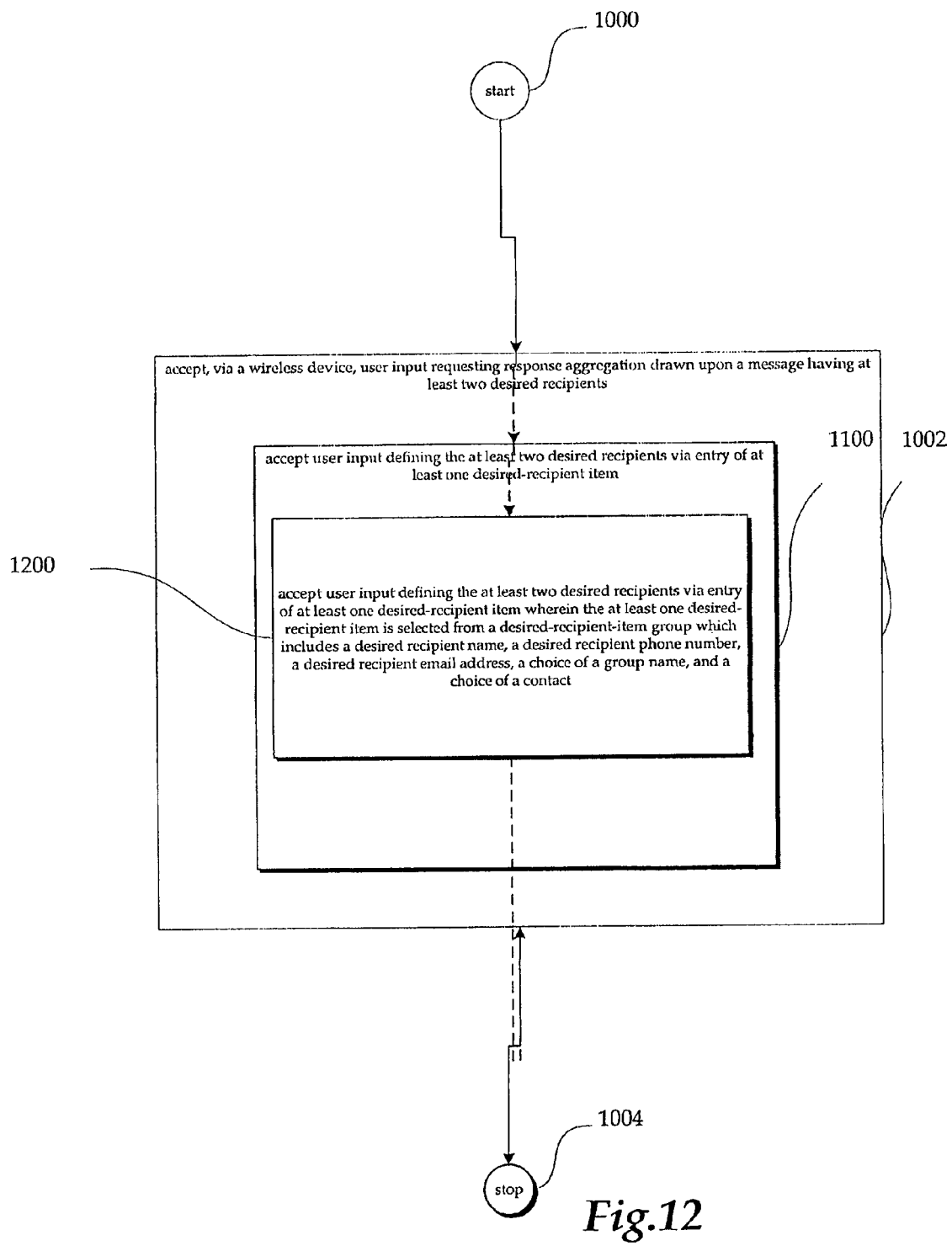
FIG. 12 shows that, in one implementation, method step 1100 includes method step 1200.

With reference now to FIG. 12, shown is an implementation of the high-level logic flowchart shown in FIG. 11. Depicted in FIG. 12 is that, in one implementation, method step 1100 includes method step 1200. Method step 1200 shows that, in one implementation, accepting user input defining the at least two desired recipients via entry of at least one desired-recipient item can include, but is not limited to, accepting user input defining the at least two desired recipients via entry of at least one desired-recipient item wherein the at least one desired recipient item is selected from a desired-recipient-item group which includes a desired recipient name, a desired recipient address, a choice of a group name, and a choice of a contact. (For example, such as was at least partially described in the herein incorporated by reference Provisional Patent Application No. 60/282,381.) The remaining method steps of FIG. 12 function substantially as described elsewhere herein. In one implementation method step 1200 is accomplished via a scheme analogous to that shown and described in relation to FIGS. 11B-E.

Figure 13:
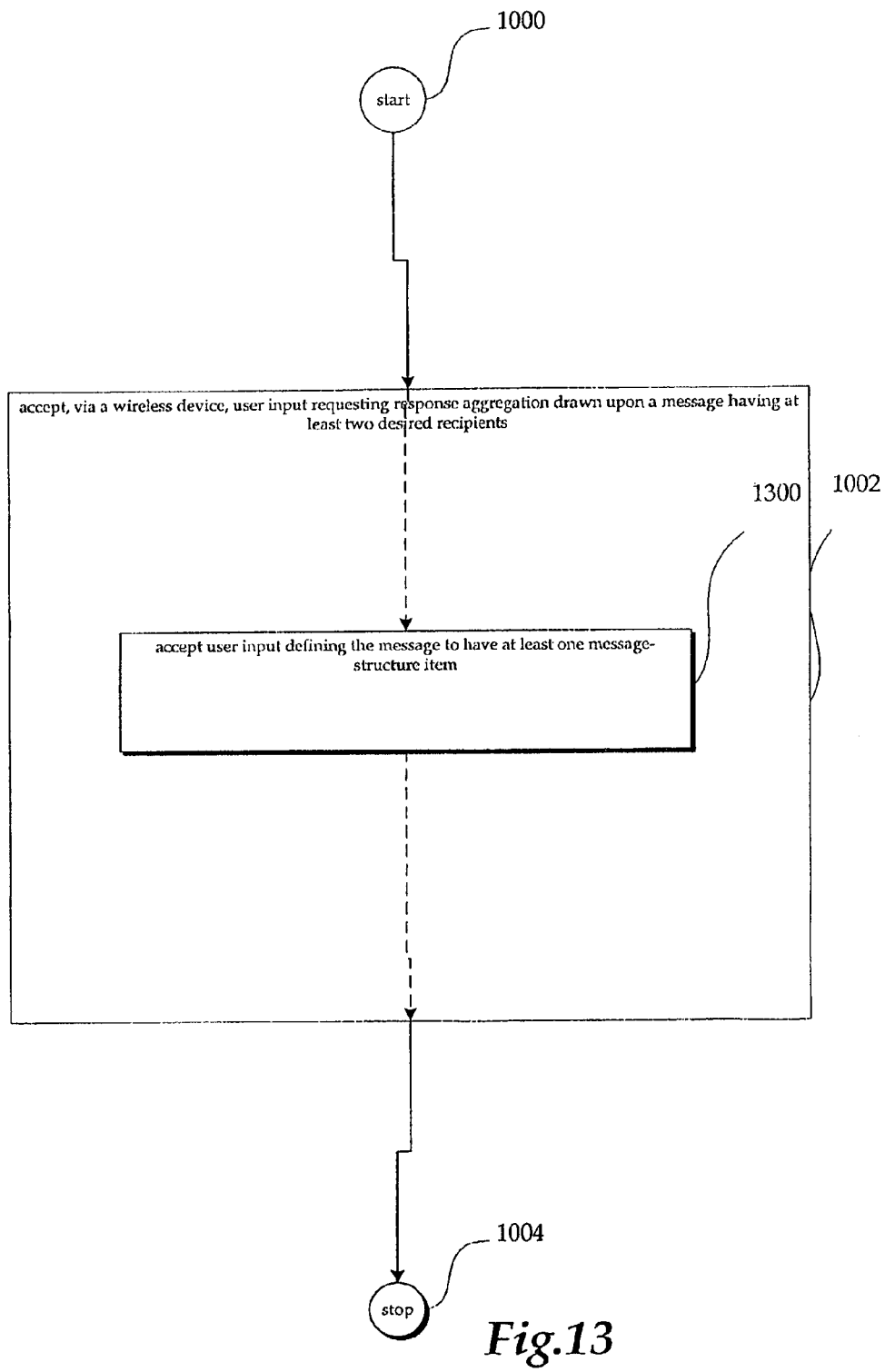
FIG. 13 shows that, in one implementation, method step 1002 includes method step 1300.

With reference now to FIG. 13, shown is an implementation of the high-level logic flowchart shown in FIG. 10. Depicted in FIG. 13 is that, in one implementation, method step 1002 includes method step 1300. Method step 1300 shows that, in one implementation, accepting, via a wireless device, user input requesting response aggregation drawn upon a message having at least two desired recipients can include, but is not limited to, accepting user input defining the message to have at least one message-structure item. (For example, such as was at least partially described in the herein incorporated by reference Provisional Patent Application No. 60/282,381.) The remaining method steps of FIG. 13 function substantially as described elsewhere herein. In one implementation method step 1300 is accomplished via a scheme analogous to that shown and described in relation to FIGS. 11B-E.

Figure 14:
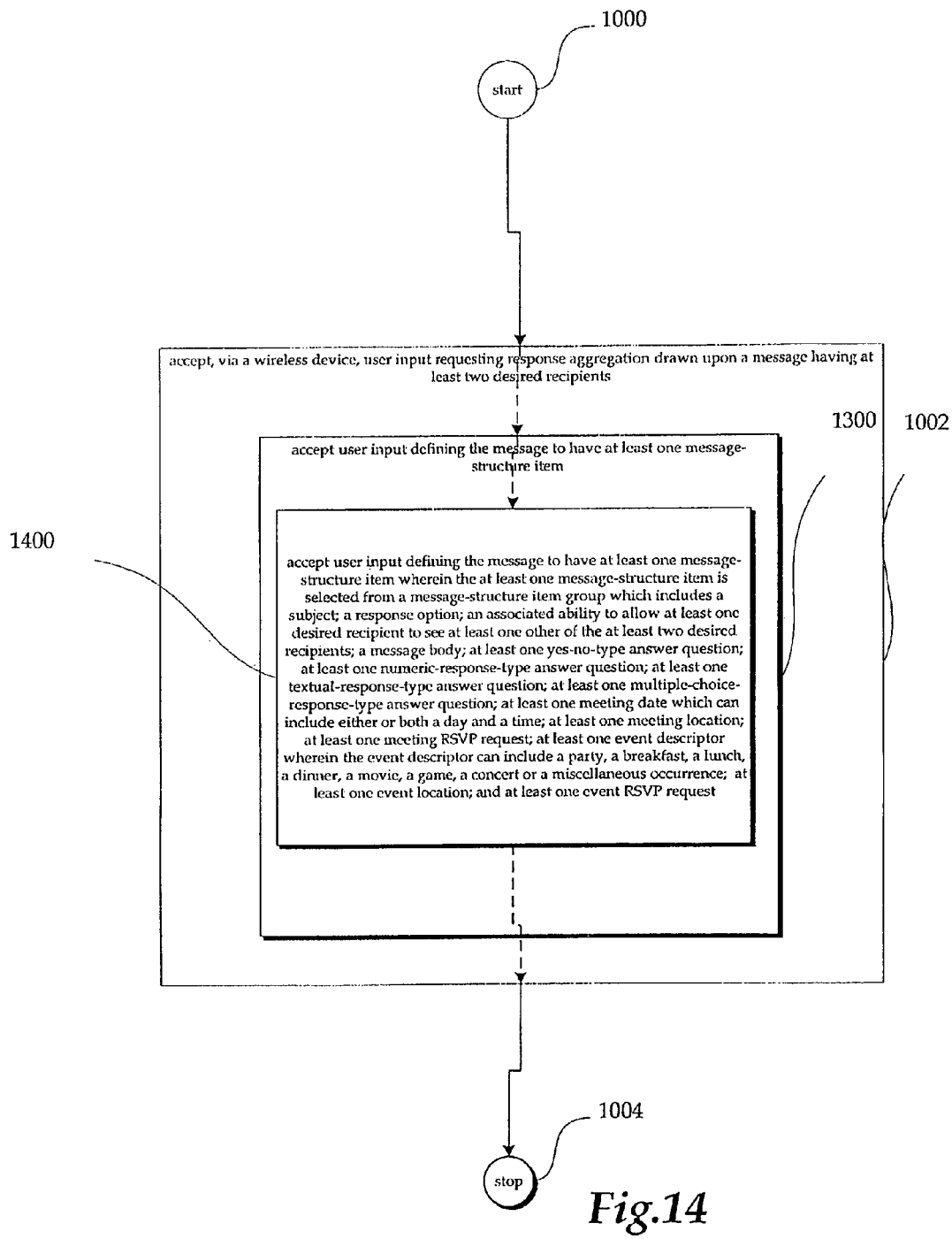
FIG. 14 depicts that, in one implementation, method step 1300 includes method step 1400.

With reference now to FIG. 14, shown is an implementation of the high-level logic flowchart shown in FIG. 13. Depicted in FIG. 14 is that, in one implementation, method step 1300 includes method step 1400. Method step 1400 shows that, in one implementation, accepting user input defining the message to have at least one message-structure item can include, but is not limited to, the at least one message-structure item selected from a message-structure-item group which includes a subject; a response option; an associated ability to allow at least one desired recipient to see at least one other of the at least two desired recipients; a message body; at least one yes-no-type answer question; at least one numeric-response-type answer question; at least one textual-response-type answer question; at least one multiple-choice-response-type answer question; at least one meeting date which can include either or both a day and a time; at least one meeting location; at least one meeting RSVP request; at least one event descriptor wherein the event descriptor can include, but is not limited to, a party, a breakfast, a lunch, a dinner, a movie, a game, a concert, or a miscellaneous occurrence; at least one event location; and at least one event RSVP request. (For example, such as was at least partially described in the herein incorporated by reference Provisional Patent Application No. 60/282,381.) The remaining method steps of FIG. 14 function substantially as described elsewhere herein. In one implementation, method step 1400 is accomplished via a scheme analogous to that shown and described in relation to FIGS. 11B-E.

Figure 15:
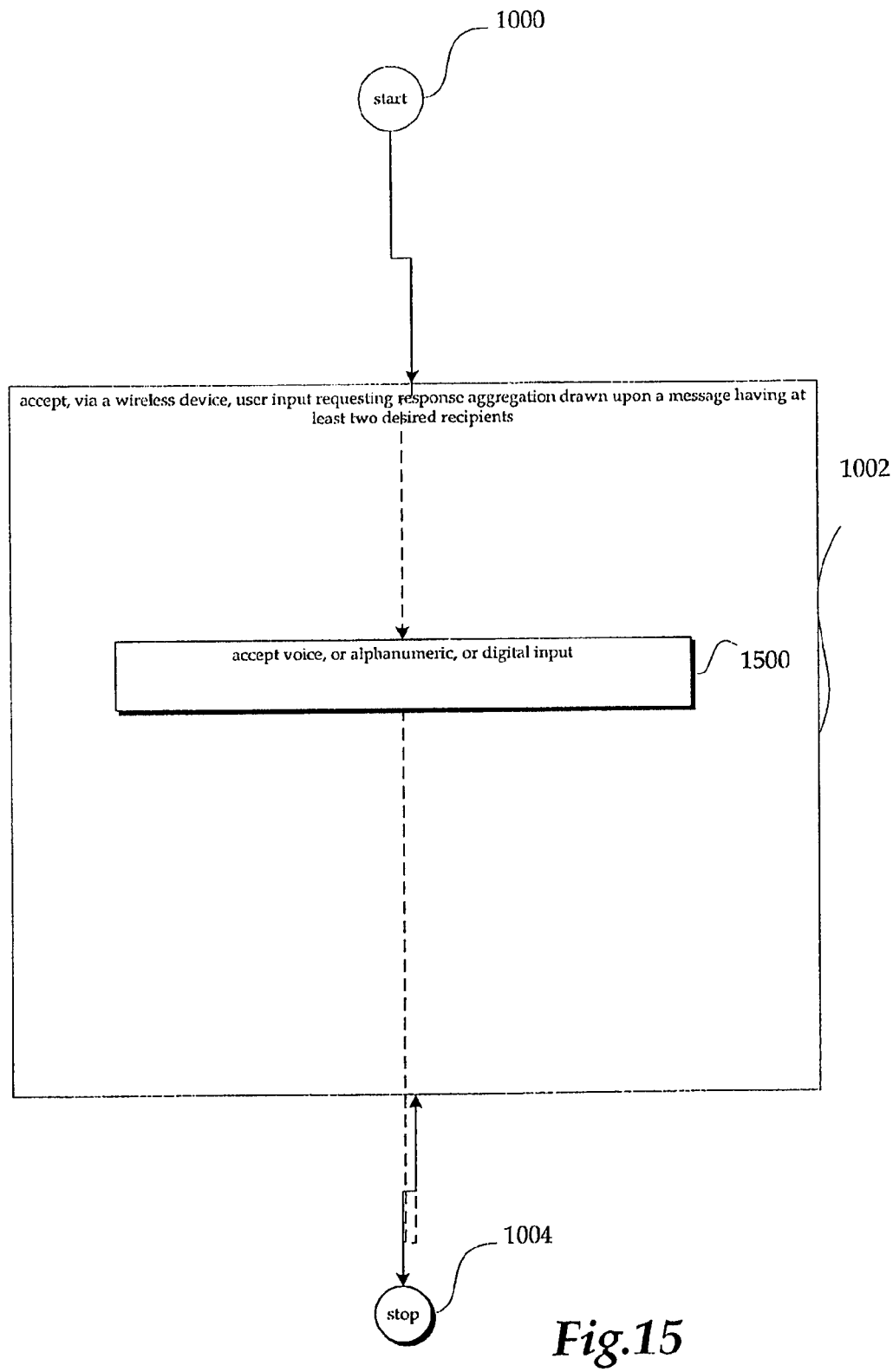
FIG. 15 shows that, in one implementation, method step 1002 includes method step 1500.

With reference now to FIG. 15, shown is an implementation of the high-level logic flowchart shown in FIG. 10. Depicted in FIG. 15 is that, in one implementation, method step 1002 includes method step 1500. Method step 1500 shows that, in one implementation, accepting, via a wireless device, user input requesting response aggregation drawn upon a message having at least two desired recipients can include, but is not limited to, accepting voice, alphanumeric, or digital input. (For example, such as was at least partially described in the herein incorporated by reference Provisional Patent Application No. 60/282,381.) The remaining method steps of FIG. 15 function substantially as described elsewhere herein. In one implementation method step 1500 is accomplished via a scheme analogous to that shown and described in relation to FIGS. 11B-E.

The Sender 100 can initiate a Managed Message from any wireless device 102 that has Internet connectivity. For simplicity, this discussion will assume the user has a WAP digital phone with a WML_UP type mini-browser. The other device types would follow very similar processes. The Sender can initiate a Managed Message by first entering the URL of the MMP web site into the browser. This is entered into the browser and when submitted the user will be transferred via the wireless carrier network to the appropriate Proxy server (WAP server) for that particular wireless service carrier.

After the URL is submitted and transferred via the wireless carrier to the Proxy or WAP server, the Proxy server makes an HTTP request to a web server. Included within the message header in the HTTP request is the information that tells the web server which type of browser the Sender is using, in this case a WML_UP browser. Within the web server, the requested script page is executed; unless specified, by default this would be the "home.asp" page so the Sender can first log into the site.

The MMP web site may be based on ASP pages, which are files that contain service-side script code that are processed on the web server (as opposed to the user's device also known as the "client"). The script code in these pages dynamically generates the information for the client as a result of a request. The login sequence is generated containing requests for a user name and password. Subsequent requests might generate any sort of data exchange including data gathering, data presentation for the client, or executing requests for action by the client. Common Script code shared by various ASP pages are grouped into a set of common code libraries and business objects.

Each ASP page generates XML data specific for that page. XSL transformations are the mechanism by which XML data is translated to any particular formats that are supported by a wireless device. The "home.asp" page calls upon common code libraries and business objects for particular instructions pertaining to the functionality found on that particular page. XML data is generated by the ASP page, and an appropriate XSL file is chosen for the client browser. The XML data is transformed using the chosen XSL file into a usable format for the client's browser to view. In this case, WML (specific for the UP.Browser) may be returned to the client via the Proxy server.

Ii. Managed Messaging as Observed from Recipients Wireless Device

Figure 16:
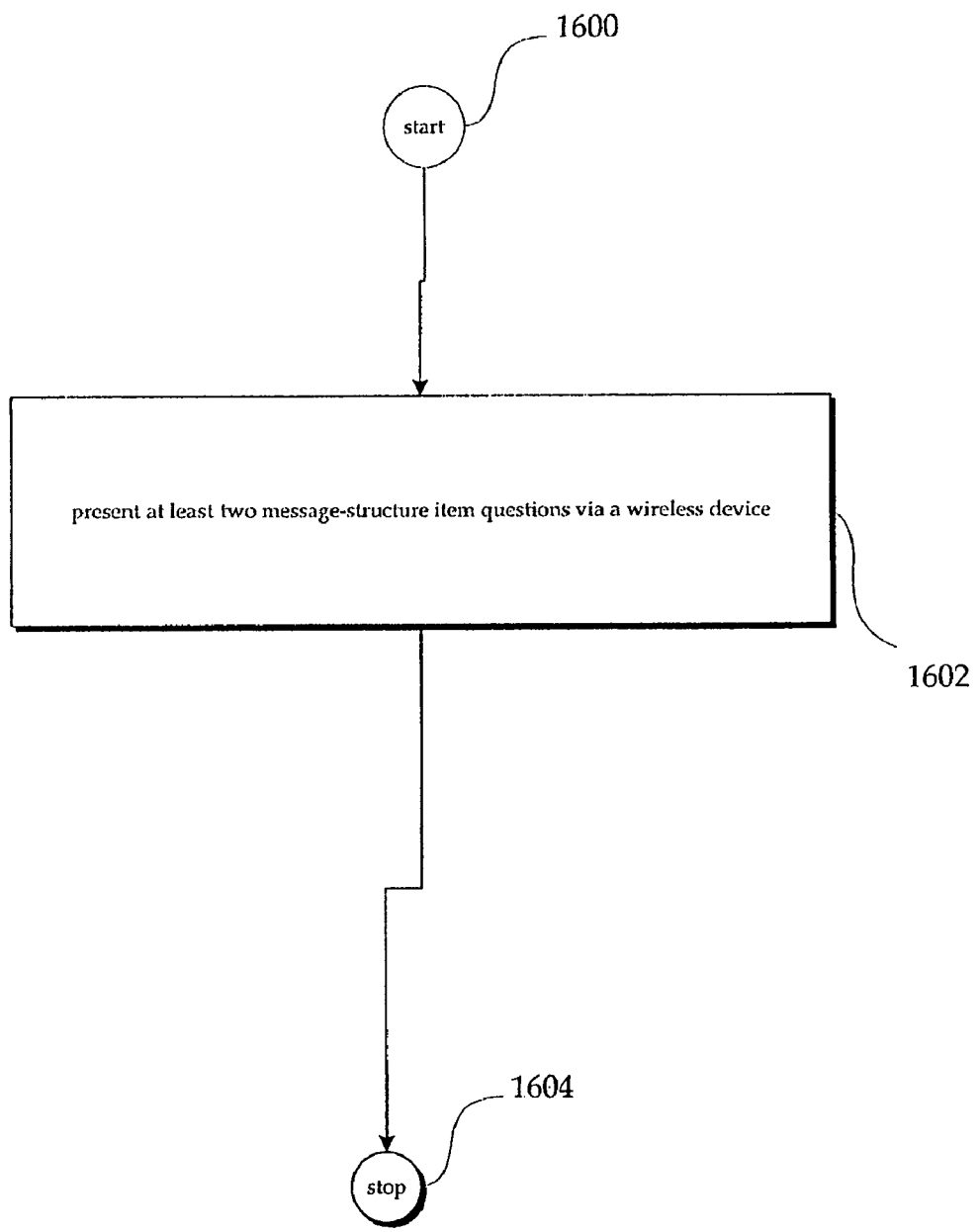
FIG. 16 depicts a process that illustrates presenting at least two questions via a wireless device.

Referring now to FIG. 16, shown is a high-level logic flowchart depicting a process. Method step 1600 depicts the start of process. Method step 1602 illustrates presenting at least two message-structure item questions via a wireless device. Method step 1604 shows the end of the process.

Figure 17:
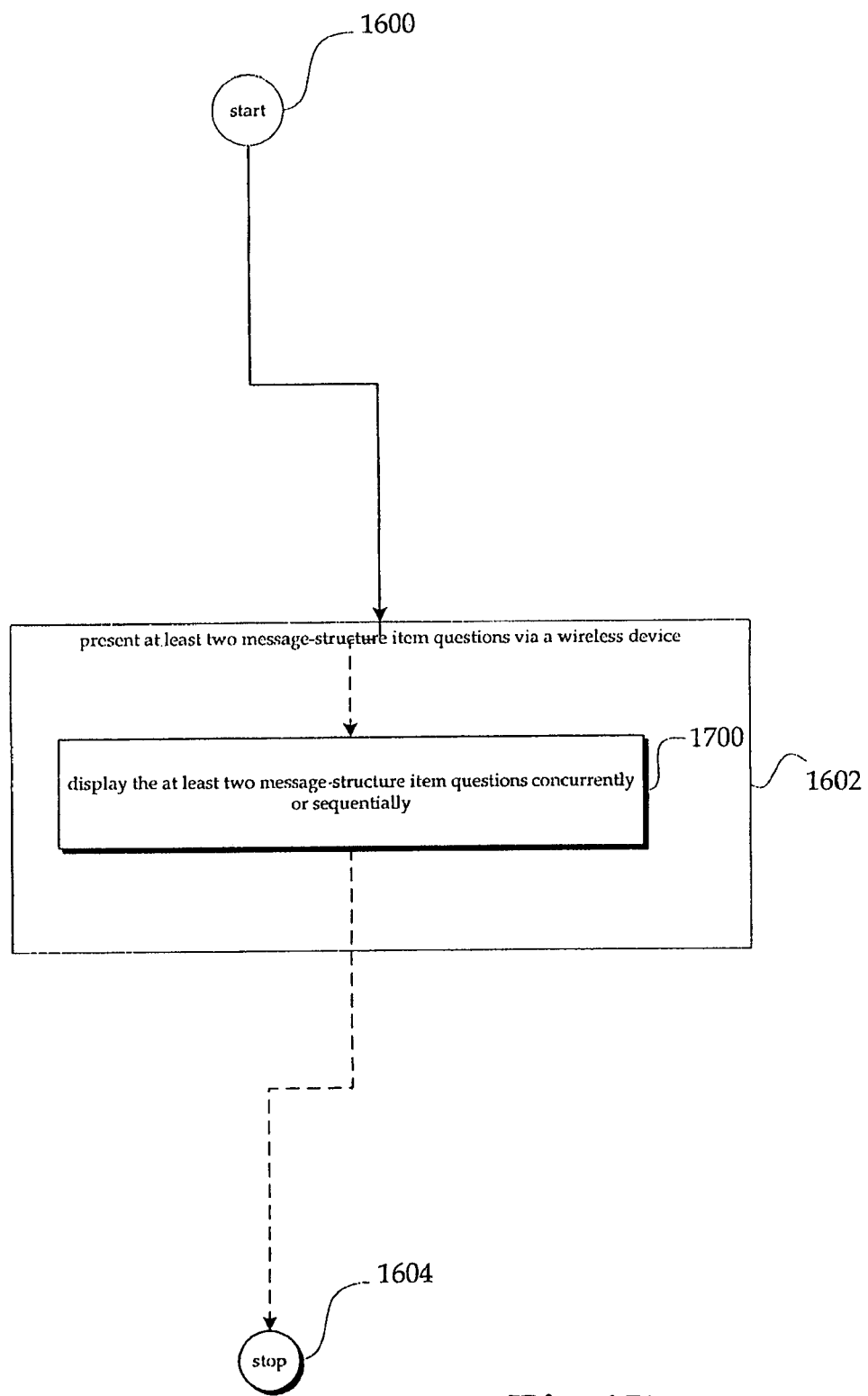
FIG. 17 shows that, in one implementation, method step 1602 includes method step 1700.

With reference now to FIG. 17, shown is an implementation of the high-level logic flowchart shown in FIG. 16. Depicted in FIG. 17 is that, in one implementation, method step 1602 includes method step 1700. Method step 1700 shows that, in one implementation, presenting at least two message-structure item questions via a wireless device can include, but is not limited to, displaying the at least two message-structure item questions concurrently or sequentially. (For example, such as was at least partially described in the herein incorporated by reference Provisional Patent Application No. 60/282,381.) The remaining method steps of FIG. 17 function substantially as described elsewhere herein.

Figure 18A:
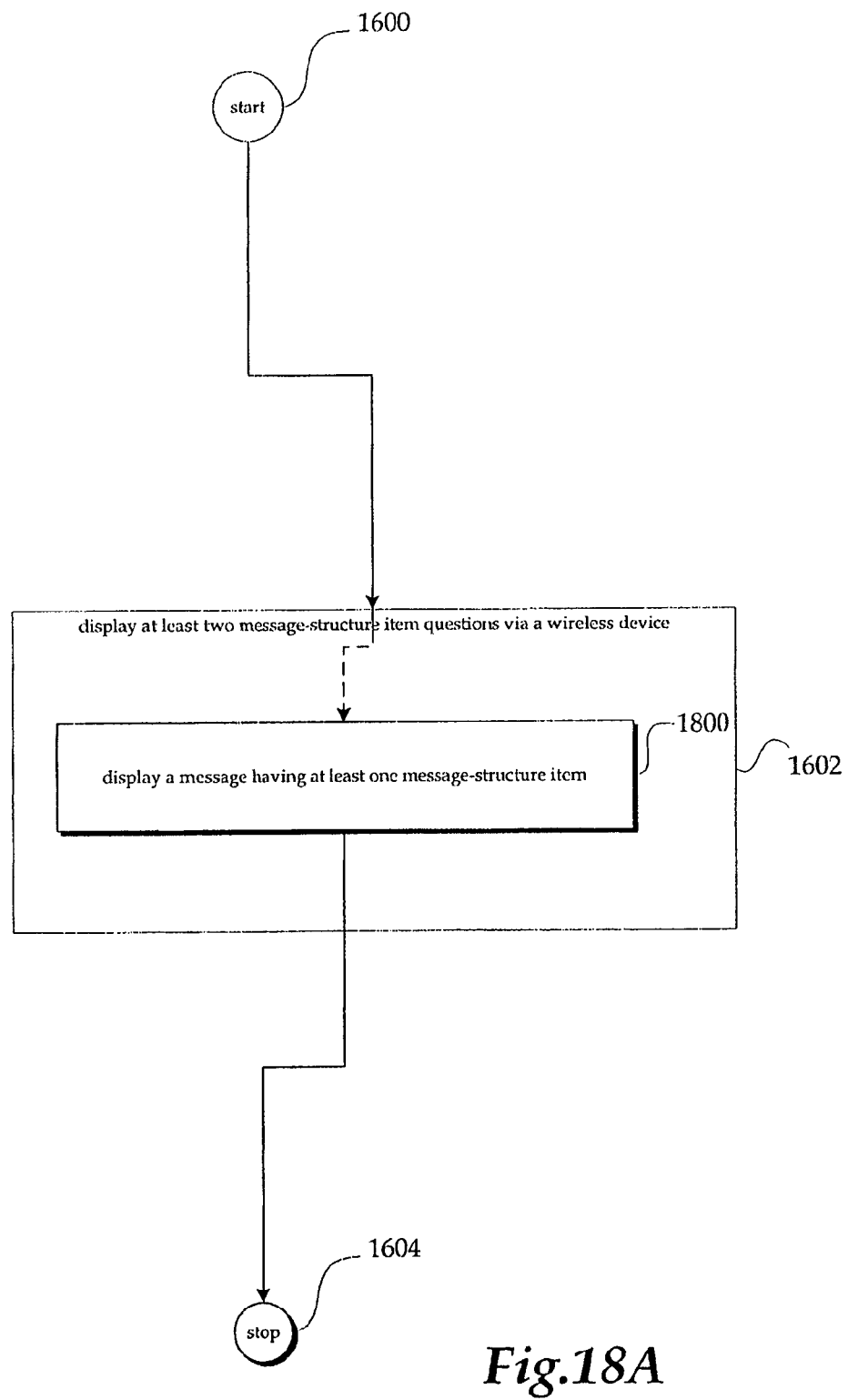
FIG. 18A depicts in one implementation, method step 1602 includes method step 1800.

With reference now to FIG. 18A, shown is an implementation of the high-level logic flowchart shown in FIG. 16.

Depicted in FIG. 18A is that, in one implementation, method step 1602 includes method step 1800. Method step 1800 shows that, in one implementation, presenting at least two message-structure item questions via a wireless device can include, but is not limited to, displaying a message having at least one message-structure item. (For example, such as was at least partially described in the herein incorporated by reference Provisional Patent Application No. 60/282,381.) The remaining method steps of FIG. 18A function substantially as described elsewhere herein.

Figures 1, 18B:
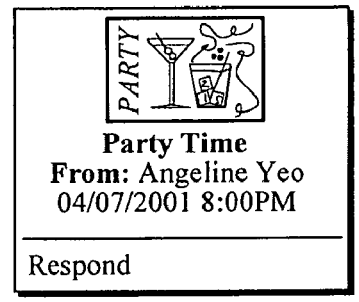
Figures 2, 18B:
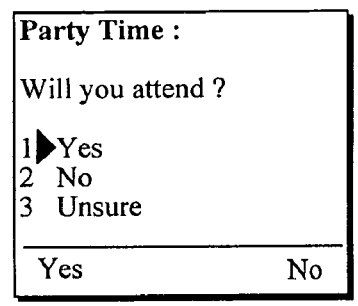
Figures 3, 18B:
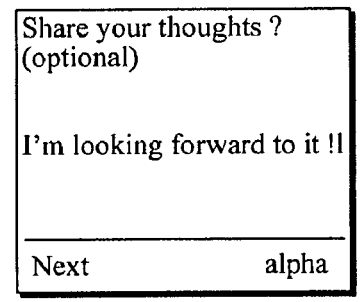
Figures 4, 18B:
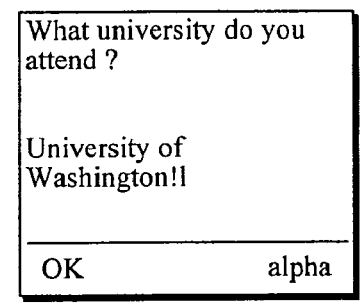
Figures 5, 18B:
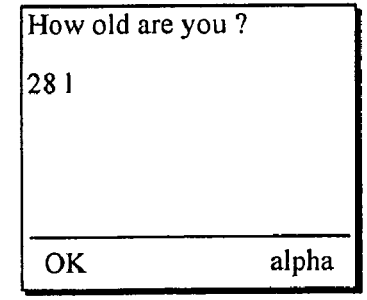

Referring now to FIGS. 18B-C, depicted is an example of a scheme used in one implementation of displaying a message having at least one message-structure item. Following are flowchart-based descriptions of various implementations of systems and devices. In general, with respect to presentation via wireless devices, implementations of these flowchart based descriptions follow the example scheme set forth in FIGS. 18B-C.

Figure 19:
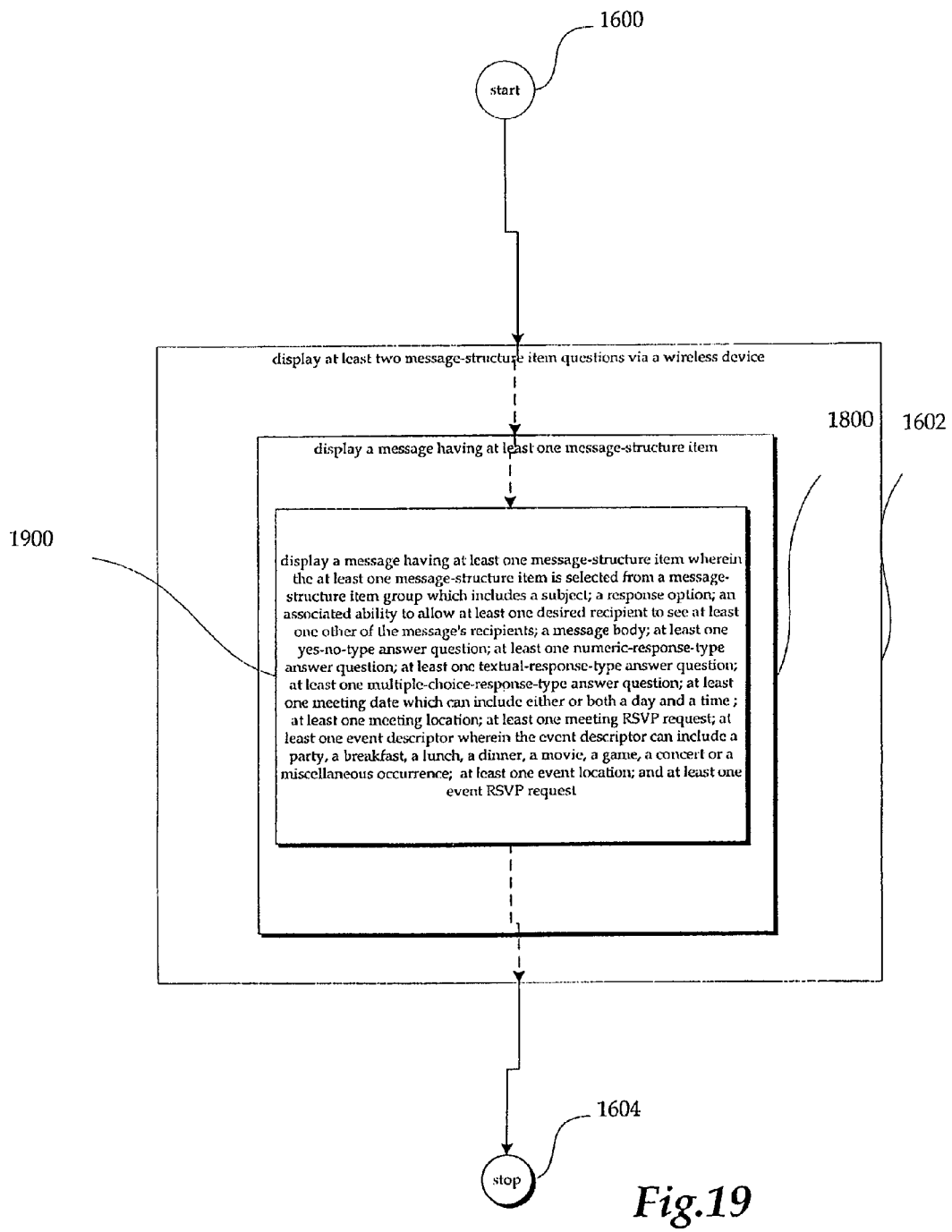
FIG. 19 shows that, in one implementation, method step 1800 includes method step 1900.

With reference now to FIG. 19, shown is an implementation of the high-level logic flowchart shown in FIG. 18A. Depicted in FIG. 19 is that, in one implementation, method step 1800 includes method step 1900. Method step 1900 shows that, in one implementation, displaying a message having at least one message-structure item can include, but is not limited to, the at least one message-structure item selected from a message-structure-item group which includes a subject; a response option; an associated ability to allow at least one desired recipient to see at least one other of the message's recipients; a message body; at least one yes-no-type answer question; at least one numeric-response-type answer question; at least one textual-response-type answer question; at least one multiple-choice-response-type answer question; at least one meeting date which can include either or both a day and a time; at least one meeting location; at least one meeting RSVP request; at least one event descriptor wherein the event descriptor can include, but is not limited to, a party, a breakfast, a lunch, a dinner, a movie, a game, a concert, or a miscellaneous occurrence; at least one event location; and at least one event RSVP request. (For example, such as was at least partially described in the herein incorporated by reference Provisional Patent Application No. 60/282,381.) The remaining method steps of FIG. 19 function substantially as described elsewhere herein.

Iii. Managed Messaging as Observed from Server Entity (E.G., MMP Engine 104)

Figure 20:
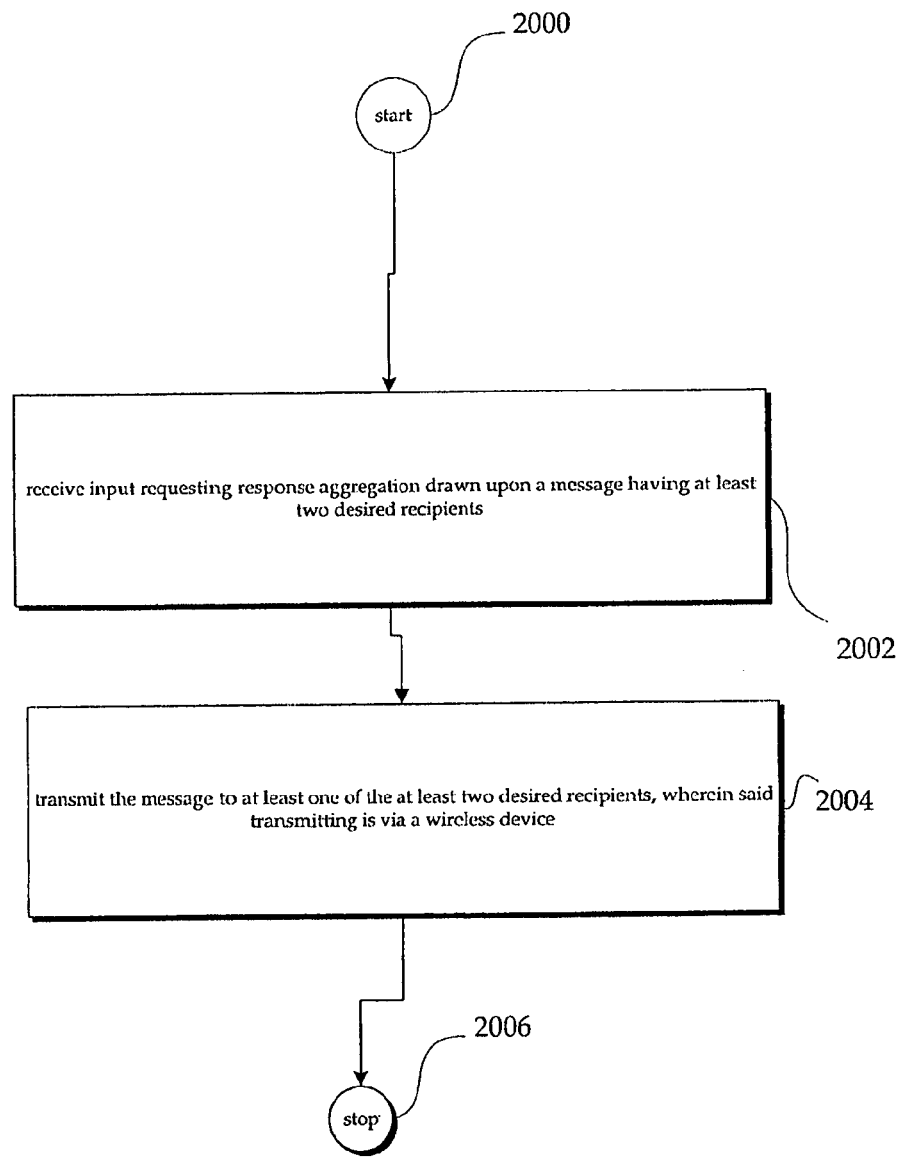
FIG. 20 shows a process that illustrates the receiving input requesting response aggregation drawn upon a message having at least two desired recipients.

With reference now to FIG. 20, shown is an implementation of a high-level logic flowchart depicting a process. Method step 2000 depicts the start of the process. Method step 2002 illustrates receiving input requesting response aggregation drawn upon a message having at least two desired recipients (e.g., MMP engine 104 receiving one or more packets containing such input from wireless device 102). Method step 2004 illustrates transmitting the message to at least one of the at least two desired recipients, wherein said transmitting is via at least one wireless device (e.g., MMP engine 104 transmitting one or more packets containing the message to one or more recipients of group 106 via such one or more recipients' respective wireless devices 108). Method step 2006 shows the end of the process.

Figure 21:
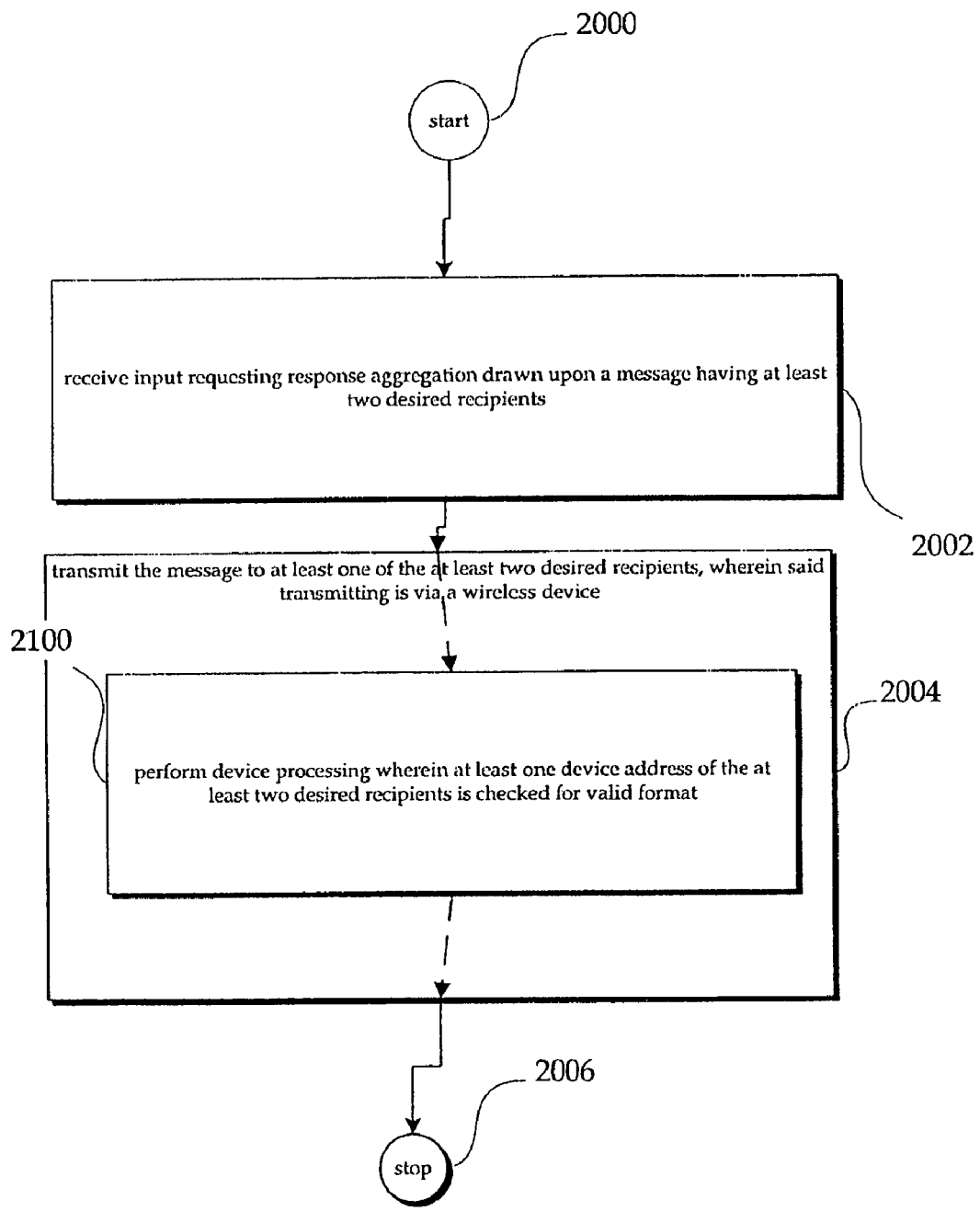
FIG. 21 shows that, in one implementation, method step 2004 includes method step 2100.

With reference now to FIG. 21, shown is an implementation of the high-level logic flowchart shown in FIG. 20. Depicted in FIG. 21 is that, in one implementation, method step 2004 includes method step 2100. Method step 2100 shows that, in one implementation, transmitting the message to at least one of the at least two desired recipients can include, but is not limited to, performing device processing wherein at least one device address of the at least two desired recipients is checked for valid format. (For example, such as was at least partially described in the herein incorporated by reference Provisional Patent Application No. 60/282,381.) The remaining method steps of FIG. 21 function substantially as described elsewhere herein.

Figure 22:
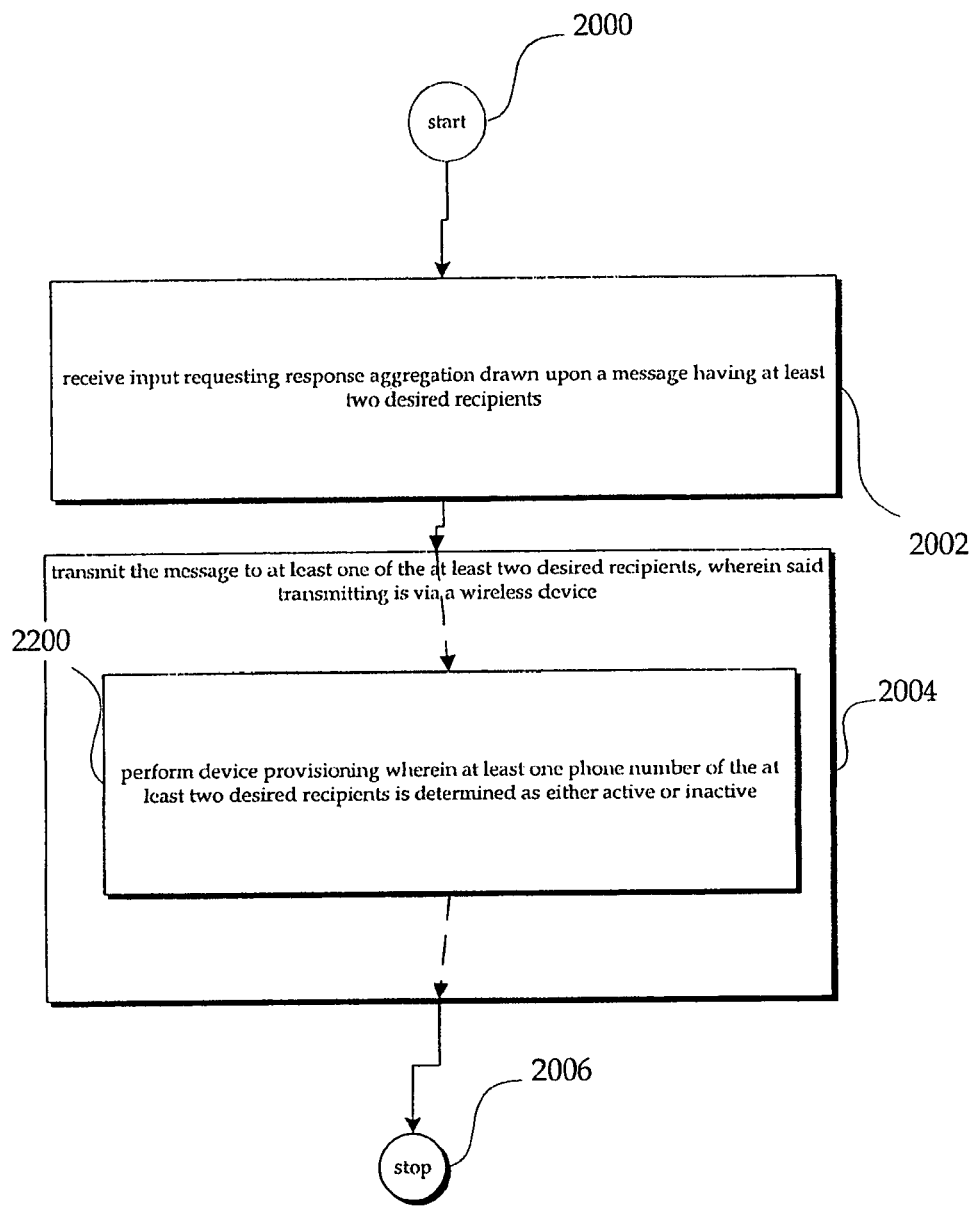
FIG. 22 shows that, in one implementation, method step 2004 includes method step 2200.

With reference now to FIG. 22, shown is an implementation of the high-level logic flowchart shown in FIG. 20. Depicted in FIG. 22 is that, in one implementation, method step 2004 includes method step 2200. Method step 2200 shows that, in one implementation, transmitting the message to at least one of the at least two desired recipients can include, but is not limited to, performing device provisioning wherein at least one phone number of the at least two desired recipients is determined as either active or inactive. (For example, such as was at least partially described in the herein incorporated by reference Provisional Patent Application No. 60/282,381.) The remaining method steps of FIG. 22 function substantially as described elsewhere herein.

Once the device is processed, device addresses identified a phone numbers are then provisioned. Provisioning is the process where any phone numbers that are in the Recipient list are validated. This asynchronous process polls the Recipient table for records marked as processed, but haven't been provisioned yet. Through an XML data exchange, the Provisioning service calls upon an external Web Service that may be offered by a third party to confirm that the number is a valid cell phone number. Additionally, the process also identifies which carrier the cell number belongs to. Finally, the type of message the phone can receive (e.g., SMS or WAP alert) is determined in order to send a notification.

The Processing and Provisioning processes both update a recipient table. Once the Recipient Table is updated with provisioned and processed Recipient addresses, then those addresses are ready for the QSender process for actual Sending of the notifications.

Processing and Provisioning take place as soon as Recipients are added to the Recipient table, even before the Sender 100 decides to send the message. When the Sender 100 executes the "Send" command through the user interface of the MMP, a new send command record is added to the QSender queue for the Managed Message. In one embodiment, an asynchronous NT Service ("QSenderSVC") checks the QSender table (the queue) and checks to see if there are any Recipient records ready to be sent out for that particular Managed Message.

The format of the different notification types are separated from the Managed Message data contained in the notification. This separation is implemented using XML and XSL transformations. There is a set of XSL files for each notification type for each target device type; e.g., there is a set of notification type XSL files for a plurality of device types.

In one embodiment, the QSender retrieves the message details from the database for each Managed Message queued to be sent. This data is assembled into an XML document according to the notification type. Based on the notification type and the target device type for each Recipient, QSender selects the appropriate XSL file to transform the XML data into the correct format to send to the Recipient device.

As with the XSL sets for the application user interface, the XSL sets for notifications can be extended to support any new target device types (e.g., to a fax machine, or even to a third-party service provider for printing and mailing post cards and letters). Similarly, notifications may be extended to support different languages.

Figure 23:
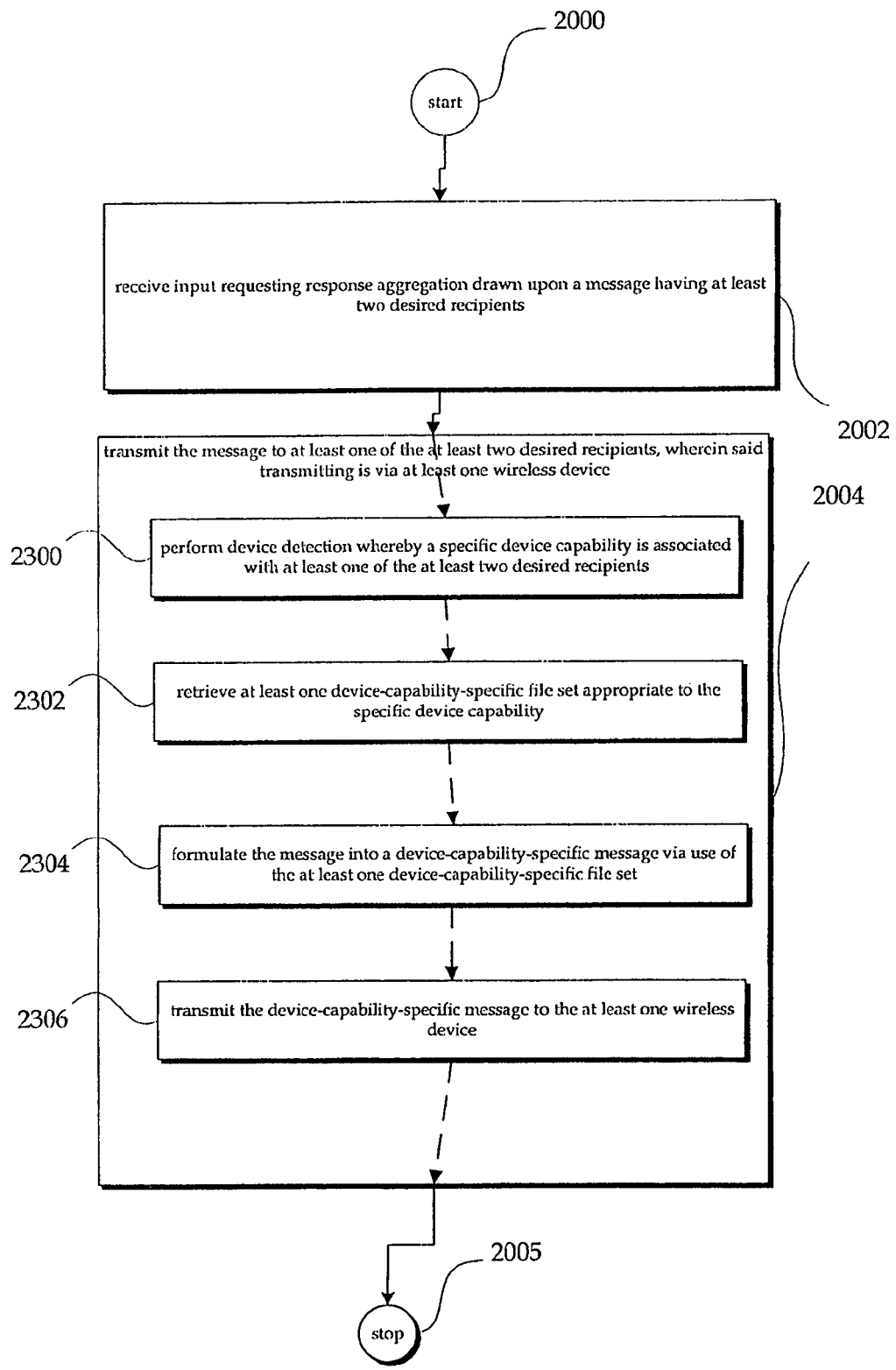
FIG. 23 shows that, in one implementation, method step 2004 can include, but is not limited to, method steps 2300-2306.

With reference now to FIG. 23, shown is an implementation of the high-level logic flowchart shown in FIG. 20. Depicted in FIG. 23 is that, in one implementation, method step 2004—transmitting the message to at least one of the at least two desired recipients—can include, but is not limited to, method steps 2300-2306. Method step 2300 shows performing device detection whereby a specific device capability is associated with at least one of the at least two desired recipients. Method step 2302 shows retrieving at least one device-capability-specific file set appropriate to the specific device capability. Method step 2304 shows formulating the message into a device-capability-specific message via use of the at least one device-capability-specific file set. Method step 2306 shows transmitting the device-capability-specific message to the at least one wireless device. (For example, such as was at least partially described in the herein incorporated by reference Provisional Patent Application No. 60/282,381.) The remaining method steps of FIG. 23 function substantially as described elsewhere herein.

Figure 24:
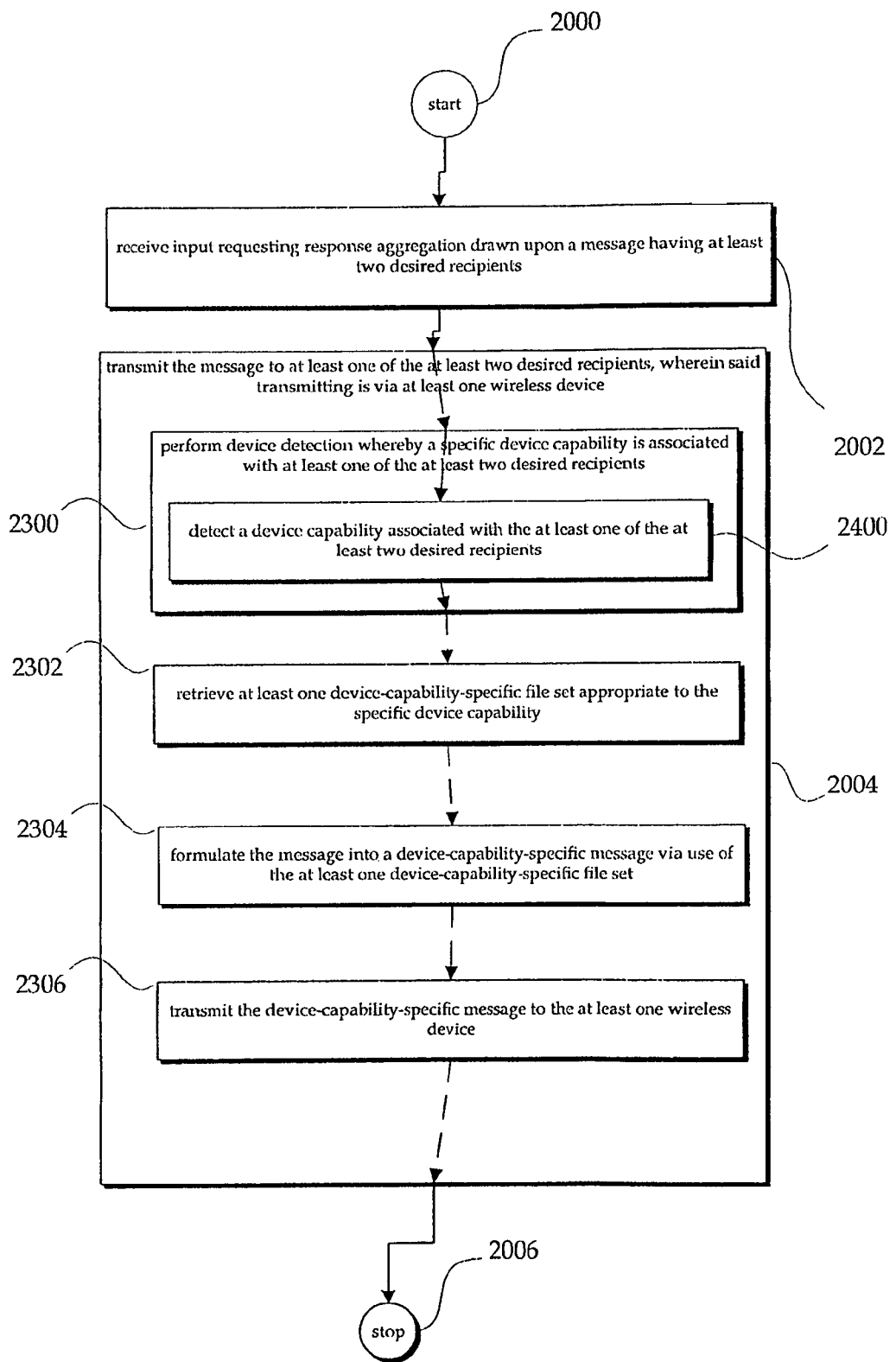
FIG. 24 shows that, in one implementation, method step 2300 can include method step 2400.

With reference now to FIG. 24, shown is an implementation of the high-level logic flowchart shown in FIG. 23. Depicted in FIG. 24 is that, in one implementation, method step 2300 can include method step 2400. Illustrated is that, in one implementation, performing device detection whereby a specific device capability is associated with at least one of the at least two desired recipients can include, but is not limited to, detecting a device capability associated with the at least one of the at least two desired recipients. (For example, such as was at least partially described in the herein incorporated by reference Provisional Patent Application No. 60/282,381.) The remaining method steps of FIG. 24 function substantially as described elsewhere herein.

Figure 25:
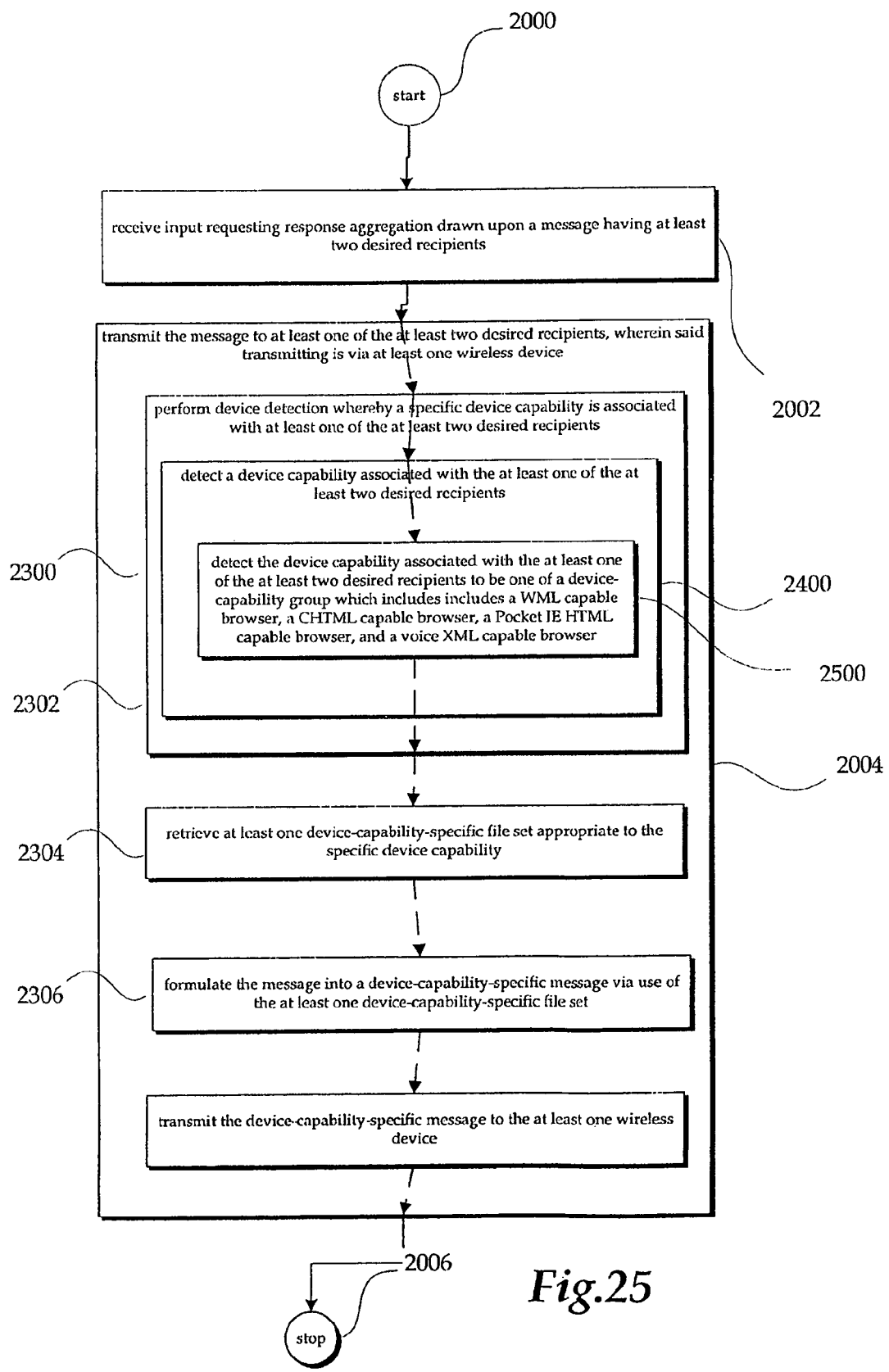
FIG. 25 shows that, in one implementation, method step 2400 can include method step 2500.

With reference now to FIG. 25, shown is an implementation of the high-level logic flowchart shown in FIG. 24. Depicted in FIG. 25 is that, in one implementation, method step 2400 can include method step 2500. Illustrated is that, in one implementation, detecting a device capability associated with the at least one of the at least two desired recipients can include, but is not limited to, detecting the device capability to be one of a device-capability group which includes a WML (Wireless Markup Language) capable browser, a CHTML (Compact Hypertext Markup Language) capable browser, a Pocket IE (Internet Explorer) HTML (Hypertext Markup Language) capable browser, and a voice XML (Extensible Markup Language) capable browser. (For example, such as was at least partially described in the herein incorporated by reference Provisional Patent Application No. 60/282,381.) The remaining method steps of FIG. 25 function substantially as described elsewhere herein.

Figure 34:
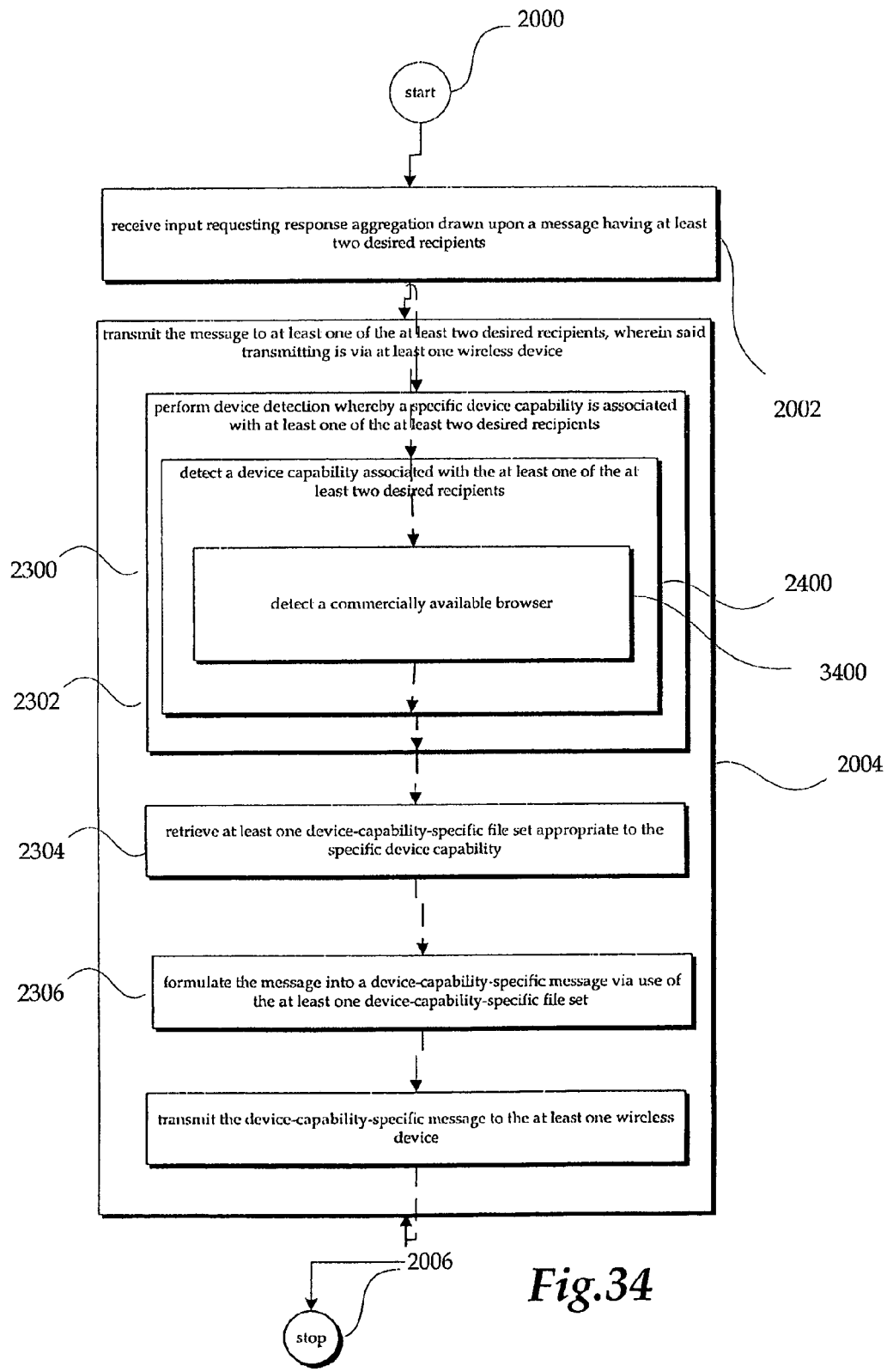
FIG. 34 shows an implementation of the high-level logic flowchart shown in FIG. 25.

With reference now to FIG. 34, shown is an implementation of the high-level logic flowchart shown in FIG. 24. Depicted in FIG. 34 is that, in one implementation, method step 2400 can include method step 3400. Illustrated is that, in one implementation, detecting a device capability associated with the at least one of the at least two desired recipients can include, but is not limited to, detecting a commercially available browser. In one device implementation, method step 3400 is achieved by a wireless web server entity (e.g., a part of MMP engine 104 of FIG. 1) when a user (e.g., a member of group of desired recipients 100) contacts the wireless web server entity via a wireless web browser on the users web-enabled cell phone (e.g., wireless device 108).

For additional examples of the process of FIG. 34 and device implementations thereof, please see herein incorporated by reference Provisional Patent Application No. 60/282,381. The remaining method steps of FIG. 34 function substantially as described elsewhere herein.

Figure 35:
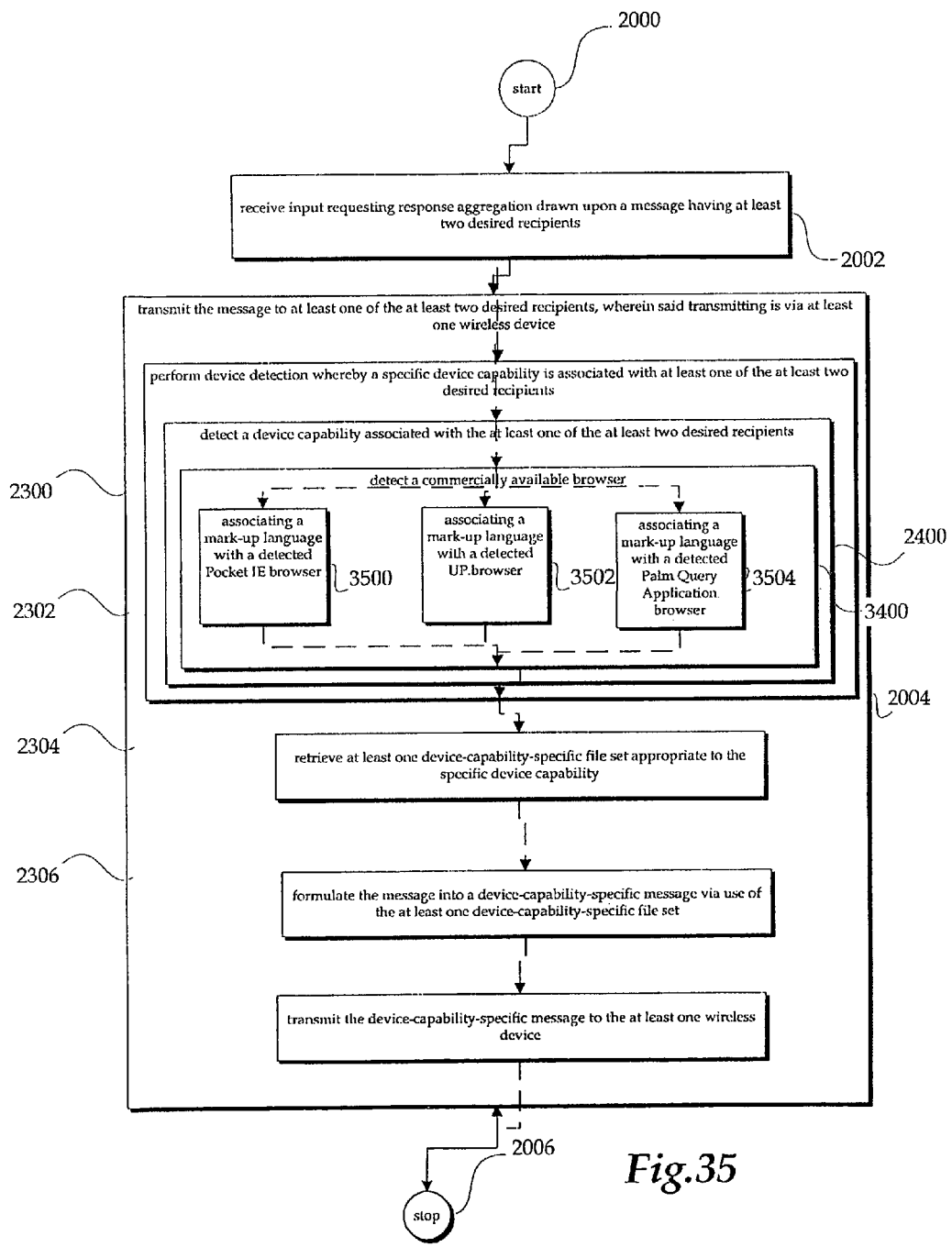
FIG. 35 shows two alternate implementations of the high-level logic flowchart shown in FIG. 34.

With reference now to FIG. 35, shown are two alternate implementations of the high-level logic flowchart shown in FIG. 34. Depicted in FIG. 35 is that, in one implementation, method step 3400 includes method step 3500; further depicted is that, in another implementation, method step 3400 includes method step 3502; further depicted is that, in yet another implementation, method step 3400 includes method step 3504. Method step 3500 shows that, in one implementation, detecting a commercially available browser can include, but is not limited to, associating a mark-up language with a detected Pocket IE browser. In one device implementation, method step 3500 is achieved by a wireless web server entity (e.g., a part of MMP engine 104 of FIG. 1) via recall of a mark-up language type associated with a version number of Pocket IE browser when a user (e.g., a member of group of desired recipients 100) contacts the wireless web server entity via a wireless web browser on the users web-enabled cell phone (e.g., wireless device 108).

Method step 3502 shows that, in one implementation, detecting a commercially available browser can include, but is not limited to, associating a mark-up language with a detected UP.browser. In one device implementation, method step 3502 is achieved by a wireless web server entity (e.g., a part of MMP engine 104 of FIG. 1) via recall of a mark-up language type associated with a version number of UP.browser when a user (e.g., a member of group of desired recipients 100) contacts the wireless web server entity via a wireless web browser on the users web-enabled cell phone (e.g., wireless device 108).

Method step 3504 shows that, in one implementation, detecting a commercially available browser can include, but is not limited to, associating a mark-up language with a detected Palm Query Application browser. In one device implementation, method step 3504 is achieved by a wireless web server entity (e.g., a part of MMP engine 104 of FIG. 1) via recall of a mark-up language type associated with a version number of Palm Query Application browser when a user (e.g., a member of group of desired recipients 100) contacts the wireless web server entity via a wireless web browser on the users web-enabled cell phone (e.g., wireless device 108).

For additional examples of the process of FIG. 35 and device implementations thereof, please see herein incorporated by reference Provisional Patent Application No. 60/282,381. The remaining method steps of FIG. 35 function substantially as described elsewhere herein.

Figure 26:
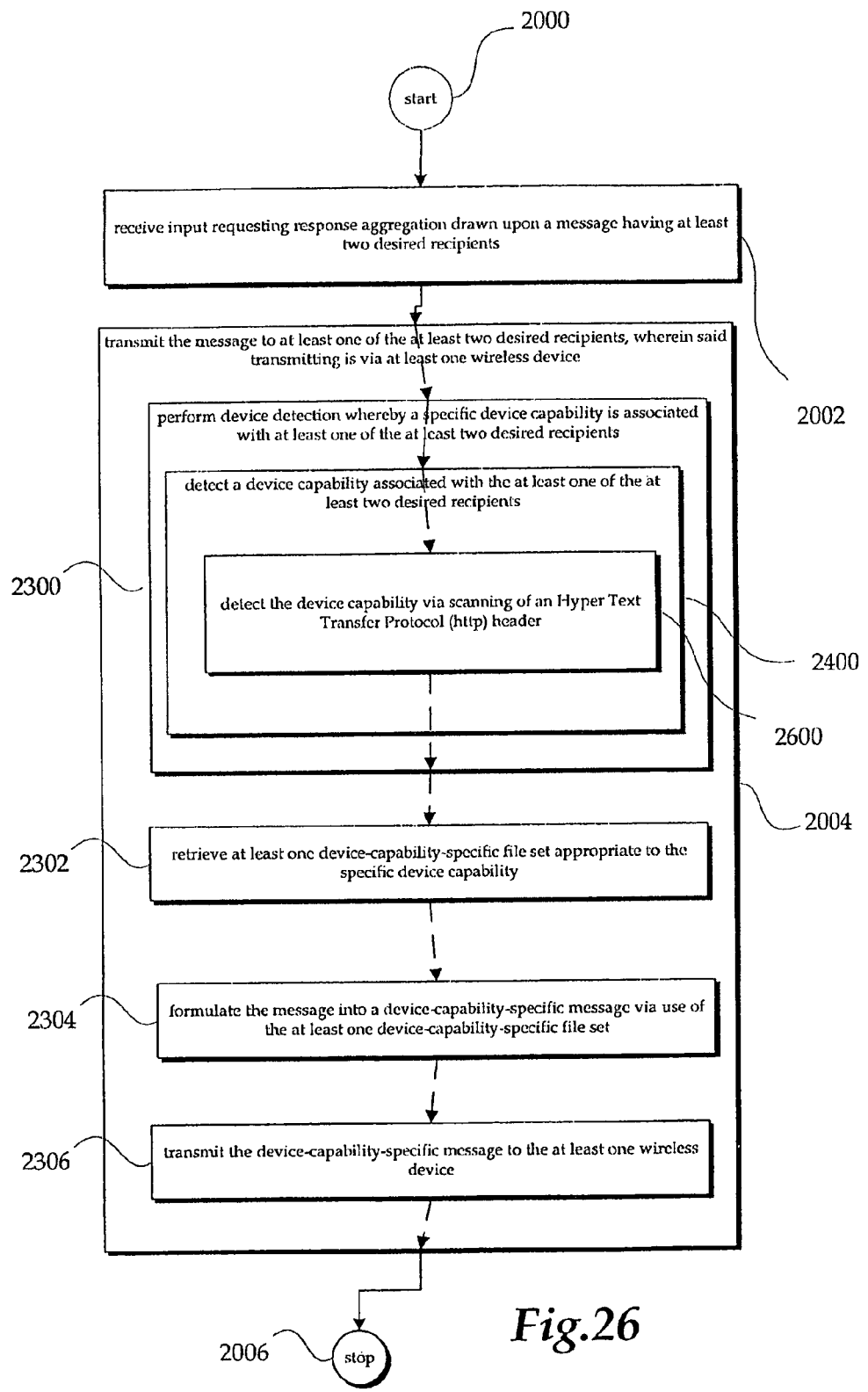
FIG. 26 shows that, in one implementation, method step 2400 can include method step 2600.

With reference now to FIG. 26, shown is an implementation of the high-level logic flowchart shown in FIG. 24. Depicted in FIG. 26 is that, in one implementation, method step 2400 can include method step 2600. Illustrated is that, in one implementation, detecting a device capability associated with the at least one of the at least two desired recipients can include, but is not limited to, detecting the device capability via scanning of a Hyper Text Transfer Protocol (http) header. (For example, such as was at least partially described in the herein incorporated by reference Provisional Patent Application No. 60/282,381.) The remaining method steps of FIG. 26 function substantially as described elsewhere herein.

Figure 27:
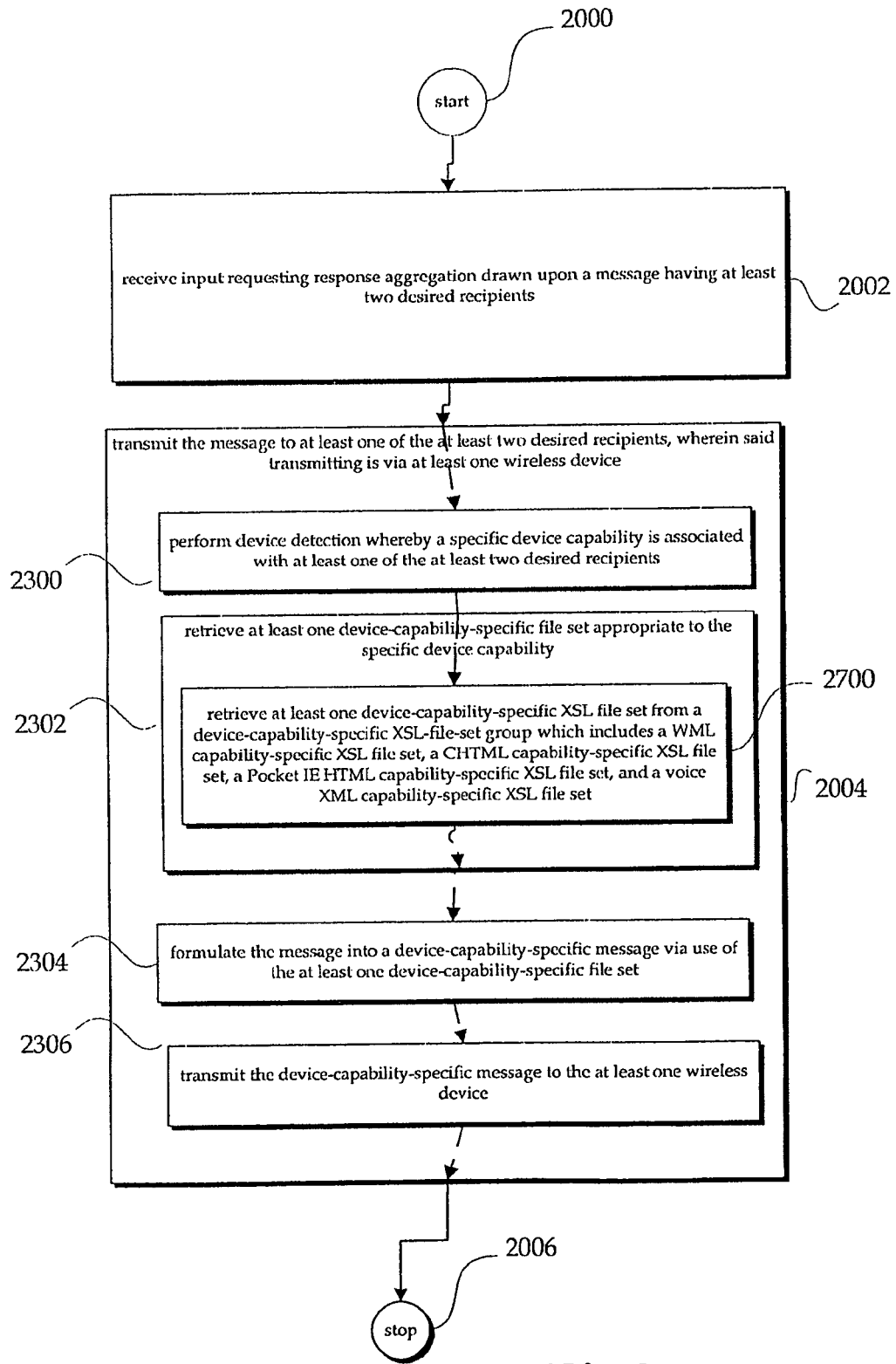
FIG. 27 shows that, in one implementation, method step 2302 can include method step 2700.

With reference now to FIG. 27, shown is an implementation of the high-level logic flowchart shown in FIG. 23. Depicted in FIG. 27 is that, in one implementation, method step 2302 can include method step 2700. Illustrated is that, in one implementation, retrieving at least one device-capability-specific file set appropriate to the specific device capability can include, but is not limited to, retrieving at least one device-capability-specific XSL (Extensible Style Language) file set from a device-capability-specific XSL-file-set group which includes a WML capability-specific XSL file set, a CHTML capability-specific XSL file set, a Pocket IE HTML capability-specific XSL file set, and a voice XML capability-specific XSL file set. (For example, such as was at least partially described in the herein incorporated by reference Provisional Patent Application No. 60/282,381.) The remaining method steps of FIG. 27 function substantially as described elsewhere herein.

Figure 28:
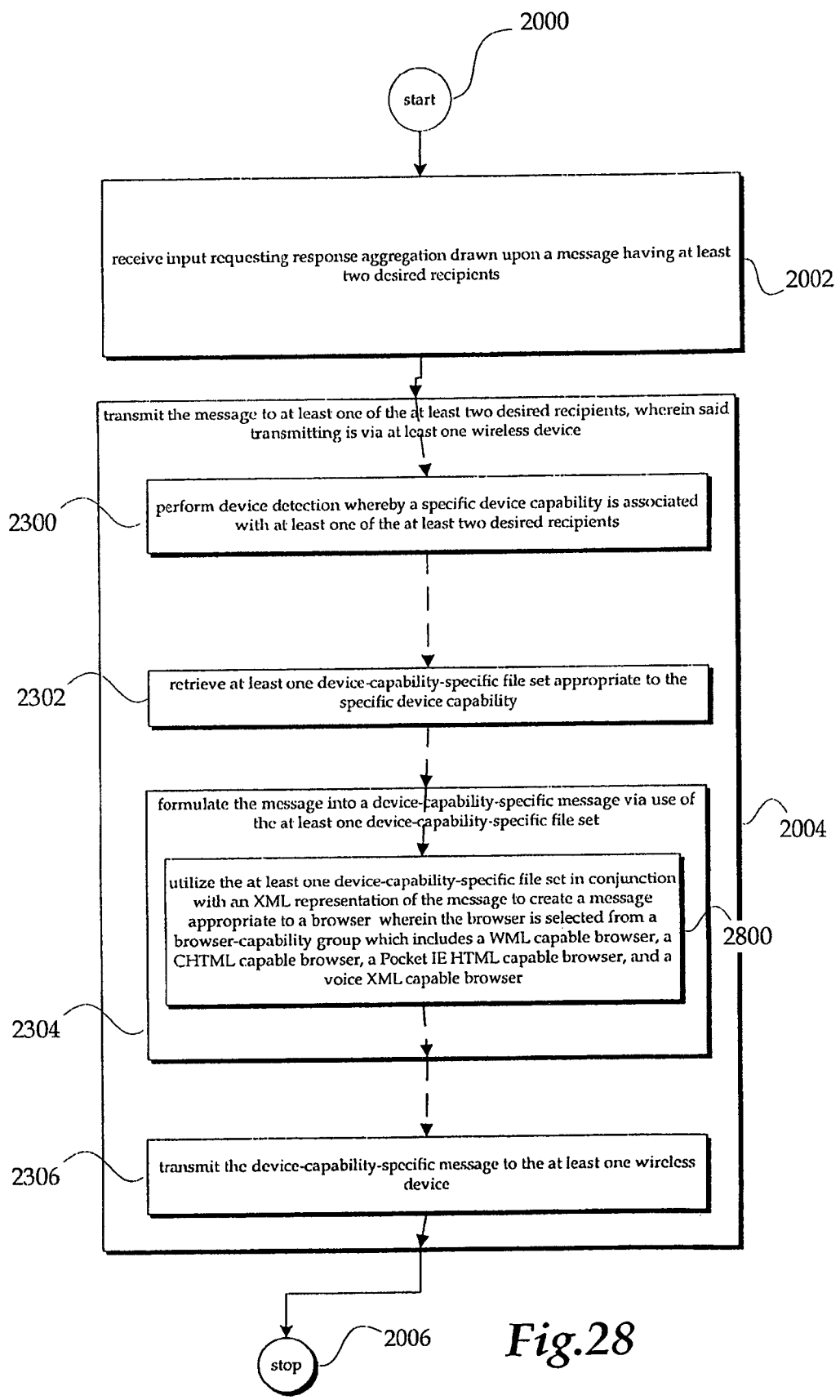
FIG. 28 shows that, in one implementation, method step 2304 can include method step 2800.

With reference now to FIG. 28, shown is an implementation of the high-level logic flowchart shown in FIG. 23. Depicted in FIG. 28 is that, in one implementation, method step 2304 can include method step 2800. Illustrated is that, in one implementation, formulating the message into a device-capability-specific message via use of the at least one device-capability-specific file set can include, but is not limited to, utilizing the at least one device-capability-specific file set in conjunction with an XML representation of the message to create a message appropriate to a browser wherein the browser is selected from a browser-capability group which includes a WML capable browser, a CHTML capable browser, a Pocket IE HTML capable browser, and a voice XML capable browser. (For example, such as was at least partially described in the herein incorporated by reference Provisional Patent Application No. 60/282,381.) The remaining method steps of FIG. 28 function substantially as described elsewhere herein.

Figure 29:
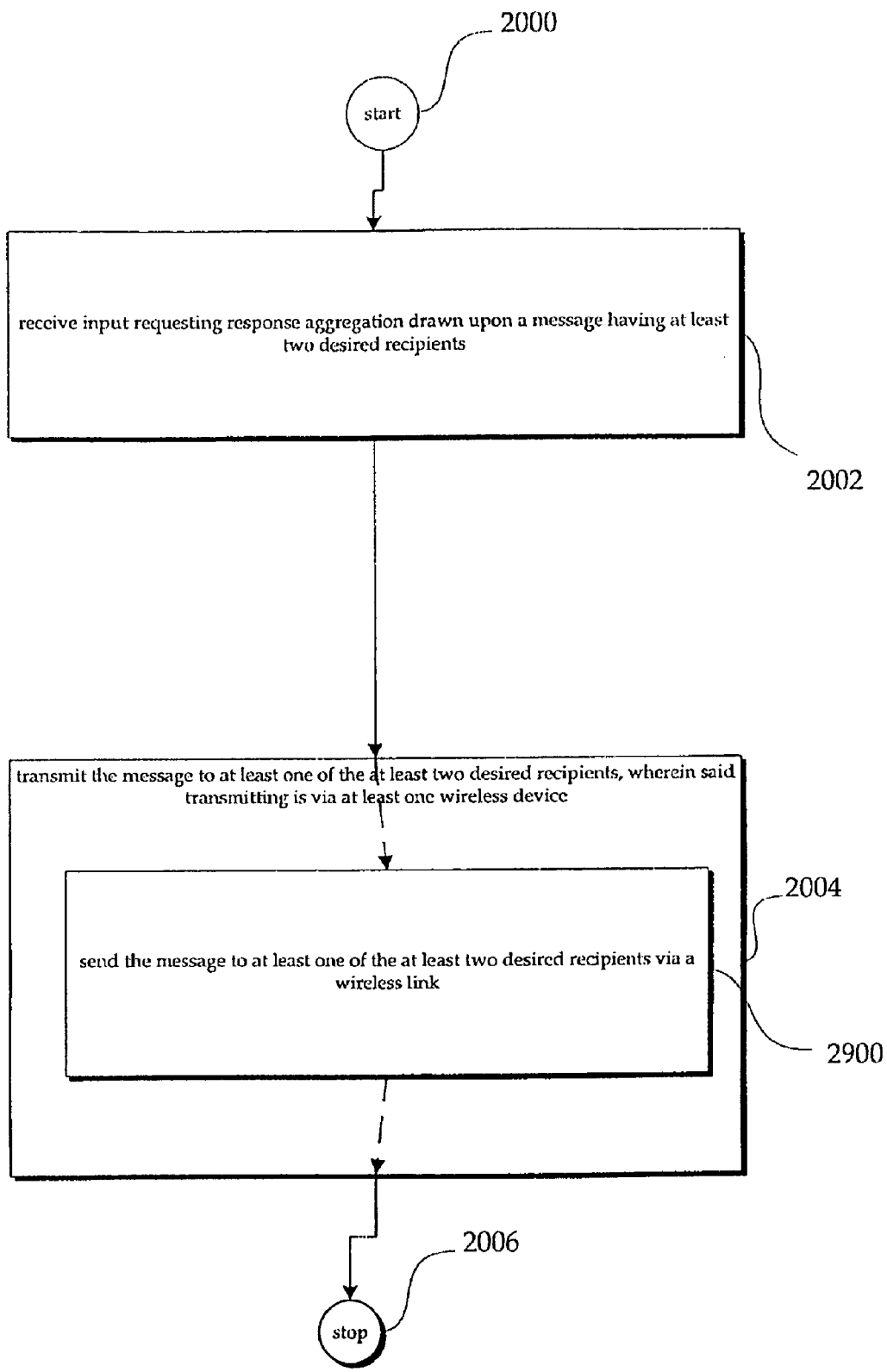
FIG. 29 depicts that, in one implementation, method step 2004 includes method step 2900.

With reference now to FIG. 29, shown is an implementation of the high-level logic flowchart shown in FIG. 20. Depicted in FIG. 29 is that, in one implementation, method step 2004 includes method step 2900. Method step 2900 shows that, in one implementation, transmitting the message to at least one of the at least two desired recipients can include, but is not limited to, sending the message to at least one of the at least two desired recipients via a wireless link. (For example, such as was at least partially described in the herein incorporated by reference Provisional Patent Application No. 60/282,381.) The remaining method steps of FIG. 29 function substantially as described elsewhere herein.

Figure 30:
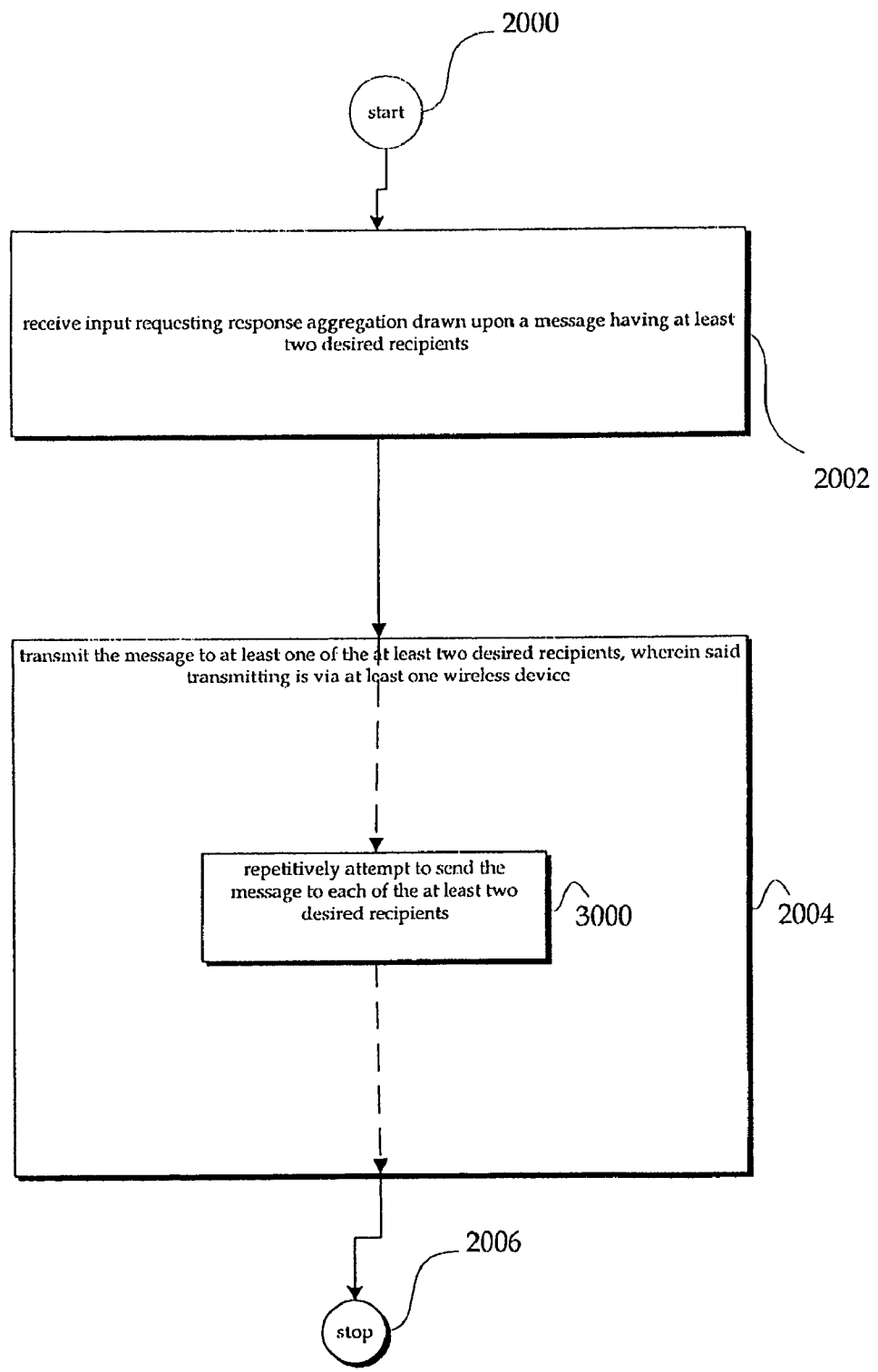
FIG. 30 shows that, in one implementation, method step 2004 includes method step 3000.

With reference now to FIG. 30, shown is an implementation of the high-level logic flowchart shown in FIG. 20. Depicted in FIG. 30 is that, in one implementation, method step 2004 includes method step 3000. Method step 3000 shows that, in one implementation, transmitting the message to at least one of the at least two desired recipients can include, but is not limited to, repetitively attempting to send the message to each of the at least two desired recipients. (For example, such as was at least partially described in the herein incorporated by reference Provisional Patent Application No. 60/282,381.) The remaining method steps of FIG. 30 function substantially as described elsewhere herein.

Figure 31:
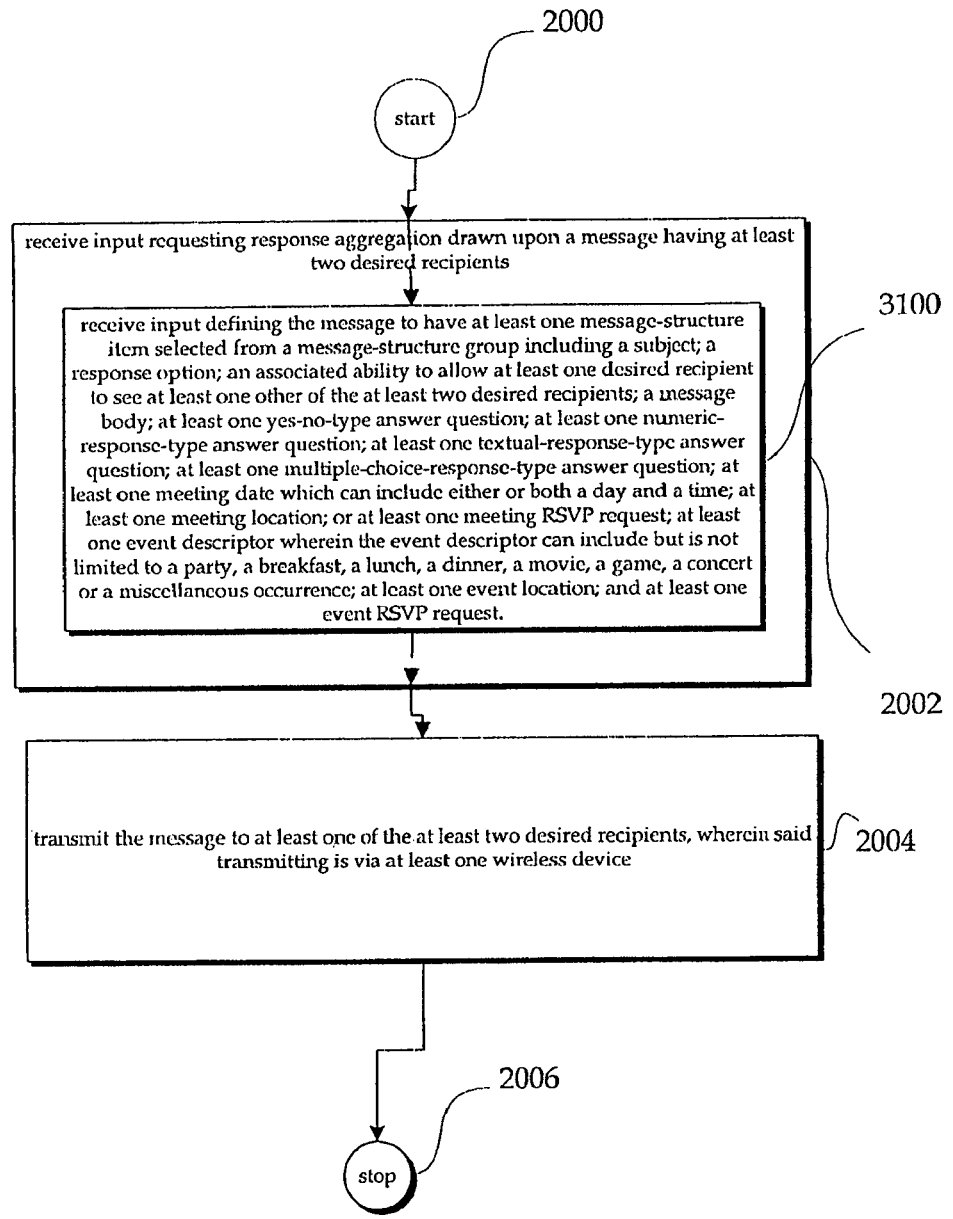
FIG. 31 shows that, in one implementation, method step 2002 includes method step 3100.

With reference now to FIG. 31, shown is an implementation of the high-level logic flowchart shown in FIG. 20. Depicted in FIG. 31 is that, in one implementation, method step 2002 includes method step 3100. Method step 3100 shows that, in one implementation, receiving input requesting response aggregation drawn upon a message having at least two desired recipients can include, but is not limited to, receiving input defining the message to have at least one message-structure item selected from a message-structure group including a subject; a response option; an associated ability to allow at least one desired recipient to see at least one other of the at least two desired recipients; a message body; at least one yes-no-type answer question; at least one numeric-response-type answer question; at least one textual-response-type answer question; at least one multiple-choice-response-type answer question; at least one meeting date which can include either or both a day and a time; at least one meeting location; or at least one meeting RSVP request; at least one event descriptor wherein the event descriptor can include, but is not limited to, a party, a breakfast, a lunch, a dinner, a movie, a game, a concert, or a miscellaneous occurrence; at least one event location; and at least one event RSVP request. (For example, such as was at least partially described in the herein incorporated by reference Provisional Patent Application No. 60/282,381.) The remaining method steps of FIG. 31 function substantially as described elsewhere herein.

Figure 32:
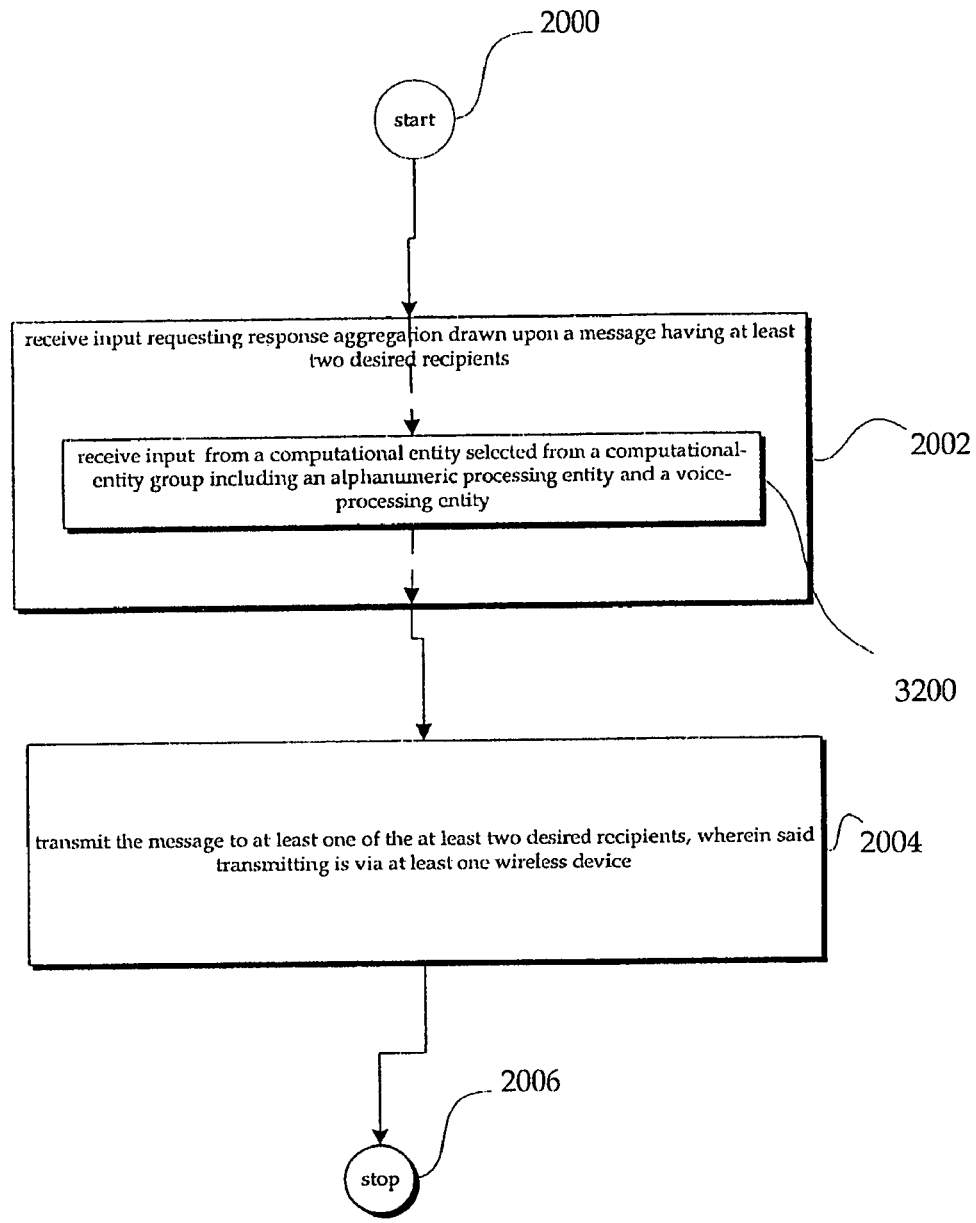
FIG. 32 shows that, in one implementation, method step 2002 includes method step 3200.

With reference now to FIG. 32, shown is an implementation of the high-level logic flowchart shown in FIG. 20. Depicted in FIG. 32 is that, in one implementation, method step 2002 includes method step 3200. Method step 3200 shows that, in one implementation, receiving input can include, but is not limited to, receiving input from an entity selected from an entity group including an alphanumeric processing entity and a voice-processing entity. For example, in one implementation method step 3200 is achieved via a wireless device (e.g., wireless device 102) transmitting to a computational entity (e.g., a part of MMP engine 104 of FIG. 1) which understands and accepts voice input, and which thereafter processes the voice input and reformulates it into alphanumeric input and subsequently transmits the alphanumeric input to the wireless web server entity (e.g., a part of MMP engine 104 of FIG. 1) which understands and accepts alphanumeric input. In another implementation. In one device implementation, method step 3200 is achieved via a wireless device (e.g., wireless device 102) transmitting to a wireless web server entity (e.g., a part of MMP engine 104 of FIG. 1) that understands and accepts alphanumeric input.

(For example, such as was at least partially described in the herein incorporated by reference Provisional Patent Application No. 60/282,381.) The remaining method steps of FIG. 32 function substantially as described elsewhere herein.

Iv. General Implementation Issues Related to Processes and/or Systems Described Herein Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more server programs running on one or more computer systems), as one or more programs running on one or more processors (e.g., as one or more thin client programs running on one or more processors), as firmware, or as virtually any combination thereof, and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configurable by a computer program (e.g., a general purpose computer configurable by a computer program or a microprocessor configurable by a computer program), electrical circuitry forming a memory device (e.g., any and all forms of random access memory), and electrical circuitry forming a communications device (e.g., a modem, communications switch, or optical-electrical equipment).

Figure 33:
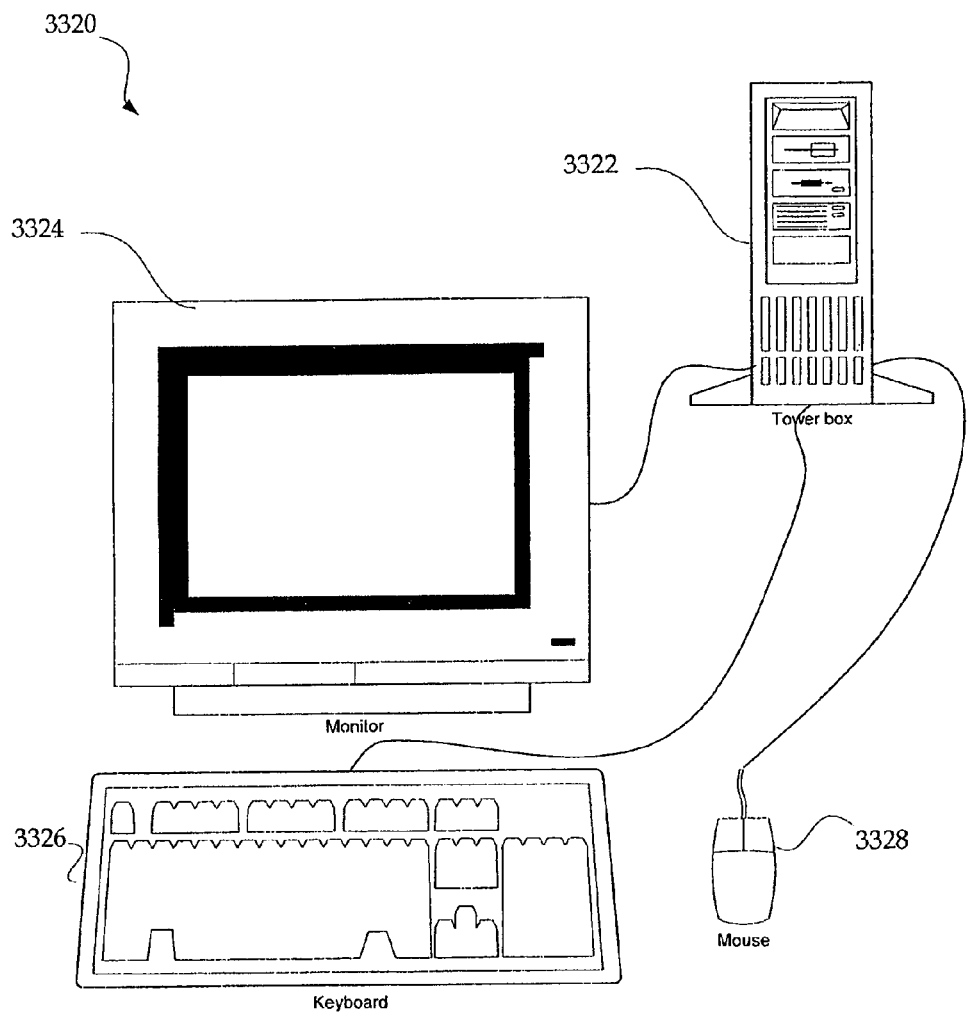
FIG. 33 depicts a pictorial representation of a conventional data processing system in which illustrative embodiments of the devices and/or processes described herein may be implemented.

Those skilled in the art will recognize that it is common within the art to describe devices and/or processes in the fashion set forth herein, and thereafter use standard engineering practices to integrate such described devices and/or processes into data processing systems. That is, the devices and/or processes described herein can be integrated into a data processing system via a reasonable amount of experimentation. FIG. 33 shows an example representation of a data processing system into which at least a part of the herein described devices and/or processes may be integrated with a reasonable amount of experimentation.

With reference now to FIG. 33, depicted is a pictorial representation of a conventional data processing system in which illustrative embodiments of the devices and/or processes described herein may be implemented. It should be noted that a graphical user interface systems (e.g., Microsoft Windows 98 or Microsoft Windows NT operating systems) and methods can be utilized with the data processing system depicted in FIG. 33. Data processing system 3320 is depicted which includes system unit housing 3322, video display device 3324, keyboard 3326, mouse 3328, and microphone (not shown). Data processing system 3320 may be implemented utilizing any suitable computer such as a DELL portable computer system, a product of Dell Computer Corporation, located in Round Rock, Tex.; Dell is a trademark of Dell Computer Corporation.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be also understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

The embodiments of the invention in which an exclusive property or privilege is claimed are defined as follows:

1. A method comprising:
    accepting, via a wireless device, input requesting response aggregation drawn upon a managed message having at least two desired recipients, the input concerning attributes of at least one message-structure item of the managed message;
    in response to accepting the input, creating the managed message based on the attributes of the at least one message-structure item, the at least one message-structure item comprising at least one response option;

detecting a device capability of a device associated with at least one of the at least two desired recipients via communication with the device;

retrieving a device-capability-specific file set appropriate to the detected device capability; and formulating the managed message into a device-capability-specific message based on the device-capability-specific file set.

2. The method of claim 1, wherein said accepting input requesting response aggregation comprises accepting user input defining the at least two desired recipients via entry of at least one desired-recipient item.

3. The method of claim 2, wherein said accepting input defining the at least two desired recipients via entry of at least one desired-recipient item comprises:

accepting input defining the at least two desired recipients via entry of at least one of a desired-recipient name, a desired-recipient phone number, a desired-recipient email address, a choice of a group name, and a choice of a contact.

4. The method of claim 1, wherein the at least one message-structure item further comprises at least one of: a subject; an associated ability to allow at least one desired recipient to see at least one other of the at least two desired recipients; a message body; at least one yes-no-type answer question; at least one numeric-response-type answer question; at least one textual-response-type answer question; at least one multiple-choice-response-type answer question; at least one meeting date which can include either or both a day and a time; at least one meeting location; at least one meeting RSVP request; at least one event descriptor wherein the event descriptor can include, but is not limited to, a party, a breakfast, a lunch, a dinner, a movie, a game, a concert, or a miscellaneous occurrence; at least one event location; and at least one event RSVP request.

5. The method of claim 1, wherein the accepting input comprises means for accepting at least one of voice, or alphanumeric, or digital input.

6. A system comprising:

means for accepting, via a wireless device, input requesting response aggregation drawn upon a managed message having at least two desired recipients, the input concerning attributes of at least one message-structure item of the managed message;

means for creating the managed message based on the attributes of the at least one message-structure item, the at least one message-structure item comprising at least one response option;

means for detecting a device capability of a device associated with at least one of the at least two desired recipients via communication with the device;

means for retrieving a device-capability-specific file set appropriate to the detected device capability; and means for formulating the managed message into a device-capability-specific message based on the device-capability-specific file set.

7. The system of claim 6, wherein said means for accepting input requesting response aggregation comprises means for accepting user input defining the at least two desired recipients via entry of at least one desired-recipient item.

8. The system of claim 7, wherein said means for accepting input defining the at least two desired recipients via entry of at least one desired-recipient item comprises means for accepting input defining the at least two desired recipients via entry of at least one of a desired-recipient name, a desired-recipient phone number, a desired-recipient email address, a choice of a group name, and a choice of a contact.

9. The system of claim 6, wherein the at least one message-structure item further comprises at least one of: a subject; an associated ability to allow at least one desired recipient to see at least one other of the at least two desired recipients; a message body; at least one yes-no-type answer question; at least one numeric-response-type answer question; at least one textual-response-type answer question; at least one multiple-choice-response-type answer question; at least one meeting date which can include either or both a day and a time; at least one meeting location; at least one meeting RSVP request; at least one event descriptor wherein the event descriptor can include, but is not limited to, a party, a breakfast, a lunch, a dinner, a movie, a game, a concert, or a miscellaneous occurrence; at least one event location; and at least one event RSVP request.

10. The system of claim 6, wherein the means for accepting input comprises means for accepting at least one voice, or alphanumeric, or digital input.

* * * * *

UNITED STATES PATENT AND TRADEMARK OFFICE
CERTIFICATE OF CORRECTION

PATENT NO. : 8,065,371 B1  
APPLICATION NO. : 12/045176  
DATED : November 22, 2011  
INVENTOR(S) : Tanumihardja et al.

Page 1 of 1

It is certified that error appears in the above-identified patent and that said Letters Patent is hereby corrected as shown below:

Title page, item (56), under "Other Publications", in Column 2, Line 4, delete "com/>" and insert -- com> --.

Signed and Sealed this  
Twenty-ninth Day of May, 2012

David J. Kappos  
*Director of the United States Patent and Trademark Office*